(12) United States Patent
Hensel et al.

(10) Patent No.: US 10,464,372 B2
(45) Date of Patent: Nov. 5, 2019

(54) LOCK RING SPREADER

(71) Applicants: Leonard Austin Hensel, Oswego, IL (US); Aaron Robert Dahl, Plainfield, IL (US); Jose Castillo, Berwyn, IL (US); Russell Kenneth Morrow, Tinley Park, IL (US)

(72) Inventors: Leonard Austin Hensel, Oswego, IL (US); Aaron Robert Dahl, Plainfield, IL (US); Jose Castillo, Berwyn, IL (US); Russell Kenneth Morrow, Tinley Park, IL (US)

(73) Assignee: GKN Armstrong Wheels, Inc., Armstrong, IA (US)

( * ) Notice: Subject to any disclaimer, the term of this patent is extended or adjusted under 35 U.S.C. 154(b) by 397 days.

(21) Appl. No.: 14/429,581

(22) PCT Filed: Sep. 18, 2013

(86) PCT No.: PCT/US2013/060337
§ 371 (c)(1),
(2) Date: Mar. 19, 2015

(87) PCT Pub. No.: WO2014/047133
PCT Pub. Date: Mar. 27, 2014

(65) Prior Publication Data
US 2015/0231924 A1    Aug. 20, 2015

Related U.S. Application Data

(60) Provisional application No. 61/703,441, filed on Sep. 20, 2012.

(51) Int. Cl.
*B60B 31/00* (2006.01)
*B25B 27/14* (2006.01)
(Continued)

(52) U.S. Cl.
CPC .............. *B60B 31/00* (2013.01); *B25B 27/14* (2013.01); *B25B 27/20* (2013.01); *B60B 31/06* (2013.01);
(Continued)

(58) Field of Classification Search
CPC ......... B25B 27/02; B25B 27/12; B25B 27/20; B25B 27/205; B25B 27/146; B25B 27/14;
(Continued)

(56) References Cited

U.S. PATENT DOCUMENTS

| 832,170 A | 10/1906 | Shaw |
| 897,841 A | 9/1908 | Mohme et al. |

(Continued)

FOREIGN PATENT DOCUMENTS

| AU | 741644 B2 | 12/2001 |
| CA | 933213 A1 | 9/1973 |

(Continued)

OTHER PUBLICATIONS

European Patent Office, Extended European Search Report, Application No. 13838522.4, dated Sep. 22, 2016.
(Continued)

*Primary Examiner* — Hadi Shakeri
(74) *Attorney, Agent, or Firm* — Quarles & Brady LLP

(57) ABSTRACT

A lock ring spreader is capable of being mounted to a lock ring having a first end and a second end. The lock ring spreader comprises a first mount that is mountable to the lock ring near the first end of the lock ring and a second mount that is mountable to the lock ring near the second end of the lock ring. A crank arm is pivotally coupled to the first mount and extends radially outward from the first mount relative to the lock ring. A link arm is pivotally coupled to the second mount and the crank arm, and extends radially outward from the second mount relative to the lock ring.

(Continued)

Pivoting the crank arm radially inward relative to the lock ring pivots the link arm relative to the crank arm and expands the distance between the first mount and the second mount.

17 Claims, 17 Drawing Sheets

(51) Int. Cl.
  *B25B 27/20* (2006.01)
  *B60B 31/06* (2006.01)
  *B60B 21/12* (2006.01)
(52) U.S. Cl.
  CPC ......... *B60B 21/125* (2013.01); *B60B 2320/10* (2013.01); *B60B 2900/112* (2013.01); *B60B 2900/113* (2013.01)
(58) Field of Classification Search
  CPC ......... B60B 31/04; B60B 31/00; B60B 31/06; B60B 21/125; B60B 2320/10; B60B 2900/112; B60B 2900/113
  USPC ..... 81/485, 488; 152/400, 401; 29/229, 235, 29/426.5, 426.6
  See application file for complete search history.

(56) References Cited

U.S. PATENT DOCUMENTS

| | | | |
|---|---|---|---|
| 1,214,315 A | 1/1917 | Kaplan | |
| 1,269,585 A * | 6/1918 | Dutcher | B60C 25/142 254/256 |
| 1,373,348 A * | 3/1921 | Nation | B60C 25/142 254/258 |
| 1,450,965 A | 4/1923 | Unger | |
| 1,473,075 A | 11/1923 | Bates | |
| 1,531,771 A | 3/1925 | Walter et al. | |
| 1,534,066 A | 4/1925 | Larkey | |
| 1,543,862 A | 6/1925 | McEwen | |
| 1,694,893 A | 12/1928 | Schneider | |
| 2,042,312 A * | 5/1936 | Huebner | B60C 25/142 254/123 |
| 2,153,941 A | 4/1939 | Smith | |
| 2,166,089 A | 7/1939 | Brenner | |
| 2,261,637 A | 11/1941 | Ash | |
| 2,270,918 A | 1/1942 | Ash | |
| 2,376,721 A | 5/1945 | Piper | |
| 2,521,260 A | 9/1950 | Sinclair | |
| 2,642,264 A * | 6/1953 | Perry | B60C 25/142 254/50.1 |
| 2,643,565 A | 6/1953 | Mount | |
| 2,660,476 A | 11/1953 | Jacobi | |
| 2,680,536 A | 6/1954 | Kojan | |
| 2,808,870 A | 10/1957 | Riggs | |
| 2,835,303 A | 5/1958 | Woodward | |
| 2,884,984 A | 5/1959 | Riggs | |
| 2,900,006 A | 8/1959 | LaFaye | |
| 3,003,538 A | 10/1961 | Gerbeth | |
| 3,009,501 A | 11/1961 | Lemmerz | |
| 3,129,034 A | 4/1964 | Walther | |
| 3,224,484 A | 12/1965 | Smith | |
| 3,421,797 A | 1/1969 | Walther | |
| 3,459,252 A | 8/1969 | Verdier | |
| 3,463,213 A | 8/1969 | Wade | |
| 3,468,584 A | 9/1969 | Tantlinger | |
| 3,529,869 A | 9/1970 | Casey | |
| 3,597,001 A | 8/1971 | Morford et al. | |
| 3,599,697 A | 8/1971 | Gerbeth | |
| 3,599,698 A | 8/1971 | Skehan et al. | |
| 3,608,607 A | 9/1971 | Gerbeth | |
| RE27,220 E | 11/1971 | Walther | |
| 3,623,530 A | 11/1971 | Beyers et al. | |
| 3,789,927 A | 2/1974 | Gurley et al. | |
| 3,882,919 A | 5/1975 | Sons, Jr. et al. | |
| 3,976,116 A | 8/1976 | Grawey et al. | |
| 3,979,976 A * | 9/1976 | Campagna, Jr. | E02D 29/14 29/244 |
| 4,003,421 A | 1/1977 | Lejeune | |
| 4,021,077 A | 5/1977 | Pringle | |
| 4,082,363 A | 4/1978 | Goodbary | |
| 4,144,922 A | 3/1979 | Strader | |
| 4,271,142 A | 6/1981 | Puglia et al. | |
| 4,369,826 A | 1/1983 | Hendrickson | |
| 4,373,567 A | 2/1983 | Declercq | |
| 4,407,348 A | 10/1983 | Suckow | |
| 4,494,686 A * | 1/1985 | L'Heureux | B25C 3/006 227/147 |
| 4,528,734 A | 7/1985 | Beyer | |
| 4,530,387 A | 7/1985 | Osawa | |
| 4,554,961 A | 11/1985 | Osawa et al. | |
| 4,573,509 A | 3/1986 | Smith et al. | |
| 4,574,859 A | 3/1986 | Smith | |
| 4,579,604 A | 4/1986 | Beyer | |
| 4,580,612 A | 4/1986 | Smithkey | |
| 4,581,481 A | 4/1986 | Moretti | |
| 4,619,302 A | 10/1986 | Mellor | |
| 4,649,978 A | 3/1987 | McCoy | |
| 4,706,723 A | 11/1987 | Loeber et al. | |
| 4,721,142 A | 1/1988 | Foster | |
| 4,744,132 A | 5/1988 | Greene et al. | |
| 4,757,590 A | 7/1988 | Hull et al. | |
| RE33,046 E | 9/1989 | Suckow | |
| 4,911,216 A | 3/1990 | Yamoto et al. | |
| 5,001,912 A | 3/1991 | DeWalch | |
| 5,014,578 A * | 5/1991 | Flentge | B25B 7/00 81/323 |
| 5,020,839 A | 6/1991 | Kalb | |
| 5,083,597 A | 1/1992 | France | |
| 5,107,914 A | 4/1992 | Yamoto et al. | |
| 5,165,312 A * | 11/1992 | Boudjack | B25B 27/0035 81/15.3 |
| 5,240,055 A | 8/1993 | Smith | |
| 5,295,304 A | 3/1994 | Ashley, Jr. | |
| 5,295,604 A * | 3/1994 | Van Ryswyk | B65D 45/345 220/321 |
| 5,325,576 A * | 7/1994 | Henderson | B23P 19/041 254/17 |
| 5,335,706 A | 8/1994 | Foster | |
| 5,345,676 A | 9/1994 | Ashley, Jr. | |
| 5,740,609 A | 4/1998 | Jurus | |
| 5,890,526 A | 4/1999 | Taylor | |
| 5,947,175 A | 9/1999 | Watanabe et al. | |
| 6,007,120 A * | 12/1999 | Vogt | B65D 45/345 292/256.65 |
| 6,148,941 A | 11/2000 | Hinton et al. | |
| 6,244,668 B1 | 6/2001 | Hale, Jr. et al. | |
| 6,247,233 B1 | 6/2001 | Hinton et al. | |
| 6,293,324 B1 | 9/2001 | Taylor | |
| 6,296,320 B1 | 10/2001 | Miyashita et al. | |
| 6,311,749 B1 | 11/2001 | Taylor | |
| 6,315,366 B1 | 11/2001 | Post et al. | |
| 6,327,763 B2 * | 12/2001 | Stephen | F16L 1/10 269/43 |
| 6,536,111 B1 | 3/2003 | Baumgarten et al. | |
| 6,568,764 B2 | 5/2003 | McNeil et al. | |
| 6,598,640 B1 | 7/2003 | Reynolds et al. | |
| 6,715,523 B2 | 4/2004 | Oba et al. | |
| 6,786,259 B2 | 9/2004 | Vehar et al. | |
| 7,237,329 B2 | 7/2007 | Burston et al. | |
| 7,284,584 B2 | 10/2007 | Kimura | |
| 7,608,607 B2 | 10/2009 | Gyurik | |
| 7,802,827 B2 * | 9/2010 | Easterday | B65D 45/345 220/321 |
| 7,971,614 B2 | 7/2011 | Durif | |
| 2002/0149256 A1 | 10/2002 | McNeil et al. | |
| 2003/0140998 A1 | 7/2003 | Oba et al. | |
| 2003/0221759 A1 | 12/2003 | Weston | |

(56) References Cited

U.S. PATENT DOCUMENTS

2009/0278399 A1 11/2009 Srivats et al.
2010/0164275 A1 7/2010 Oba et al.

FOREIGN PATENT DOCUMENTS

| | | |
|---|---|---|
| CA | 1138916 A1 | 1/1983 |
| CA | 1270282 A1 | 6/1990 |
| CN | 1219480 A | 6/1999 |
| CN | 2726923 Y | 9/2005 |
| DE | 201 02 624 | 4/2001 |
| EP | 0114782 A2 | 8/1984 |
| EP | 1174285 A2 | 1/2002 |
| EP | 1186442 A2 | 3/2002 |
| FR | 2437256 A1 | 4/1980 |
| GB | 2154957 A | 9/1985 |
| GB | 2246746 A | 2/1992 |
| JP | S57158101 A | 9/1982 |
| JP | S57158102 A | 9/1982 |
| JP | S58081804 A | 5/1983 |
| JP | S58101802 A | 6/1983 |
| JP | S58122203 A | 7/1983 |
| JP | S58139801 A | 8/1983 |
| JP | S59230801 A | 12/1984 |
| JP | S60121101 A | 6/1985 |
| JP | S62247902 A | 10/1987 |
| JP | H02169302 A | 6/1990 |
| JP | H03281403 A | 12/1991 |
| JP | H07132701 A | 5/1995 |
| JP | H07132702 A | 5/1995 |
| JP | H07257102 A | 10/1995 |
| JP | H09328001 A | 12/1997 |
| JP | H10024701 A | 1/1998 |
| JP | 2000185504 A | 7/2000 |
| JP | 2000247102 A | 9/2000 |
| JP | 2001158202 A | 6/2001 |
| JP | 2001219707 A | 8/2001 |
| JP | 2001225604 A | 8/2001 |
| JP | 2003220801 A | 8/2003 |
| JP | 2005343344 A | 12/2005 |
| JP | 2006007959 A | 1/2006 |
| JP | 2008222207 A | 9/2008 |
| WO | 8300661 A1 | 3/1983 |
| WO | 8401747 A1 | 5/1984 |
| WO | 9200216 A1 | 1/1992 |
| WO | 0012328 A1 | 3/2000 |
| WO | 2004009377 A2 | 1/2004 |
| WO | 2008099775 A1 | 8/2008 |
| WO | 2009049762 A1 | 4/2009 |

OTHER PUBLICATIONS

International Search Report and Written Opinion dated Feb. 18, 2014 for International Application No. PCT/US2013/060337.
Titan Wheel Corporation of Illinois, Brochure: Titan Wheels Titan Moves the World of Mining STMT 63 ACT 63, Copyright 2009, 6 pages.
Lowe, Wheels Within Wheels, IVT International, Mar. 2009, pp. 72-73.
Northern Wheel Inc., Brochure: LeTourneau Wheels, date unknown, 1 page.

* cited by examiner

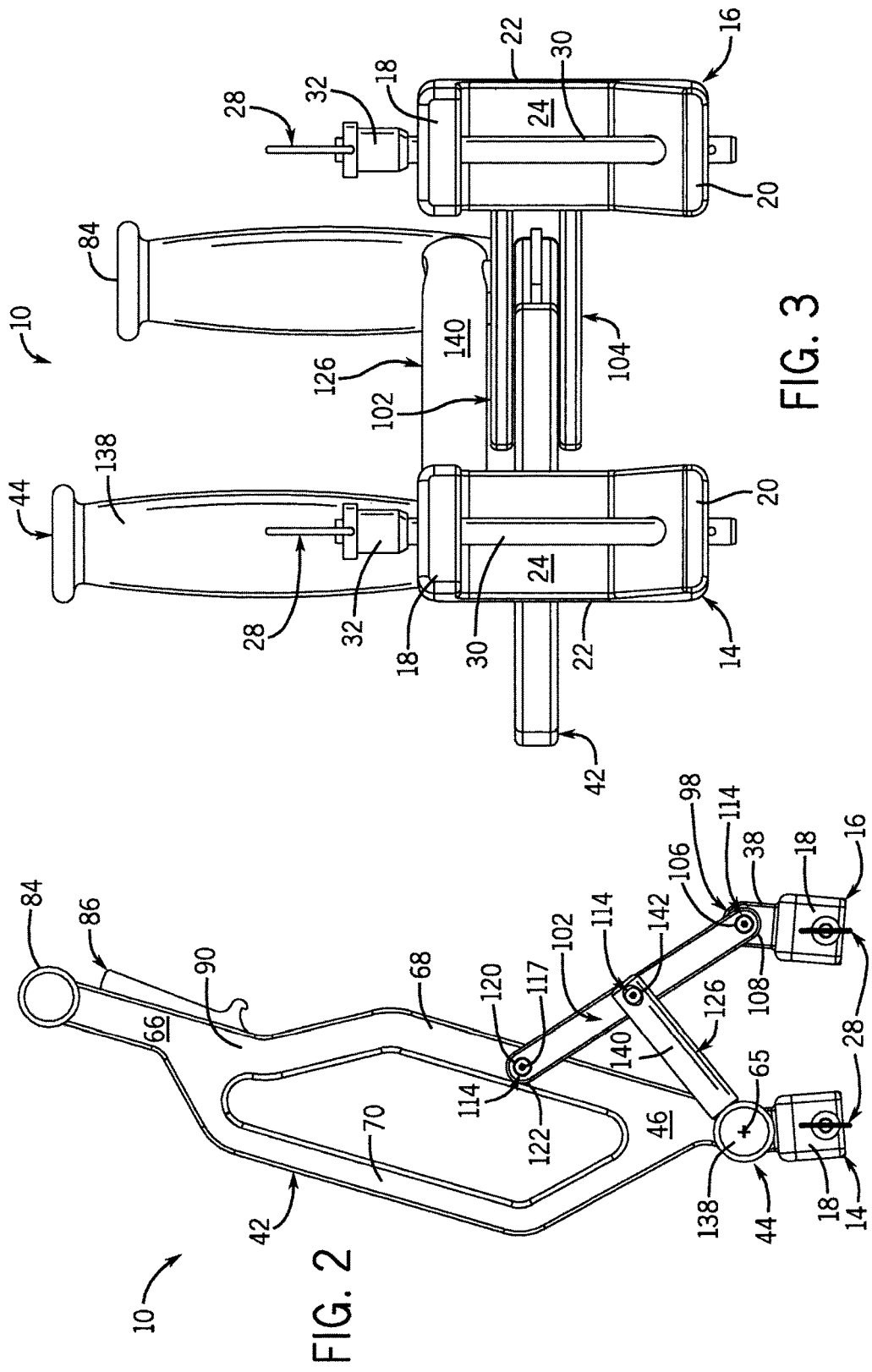

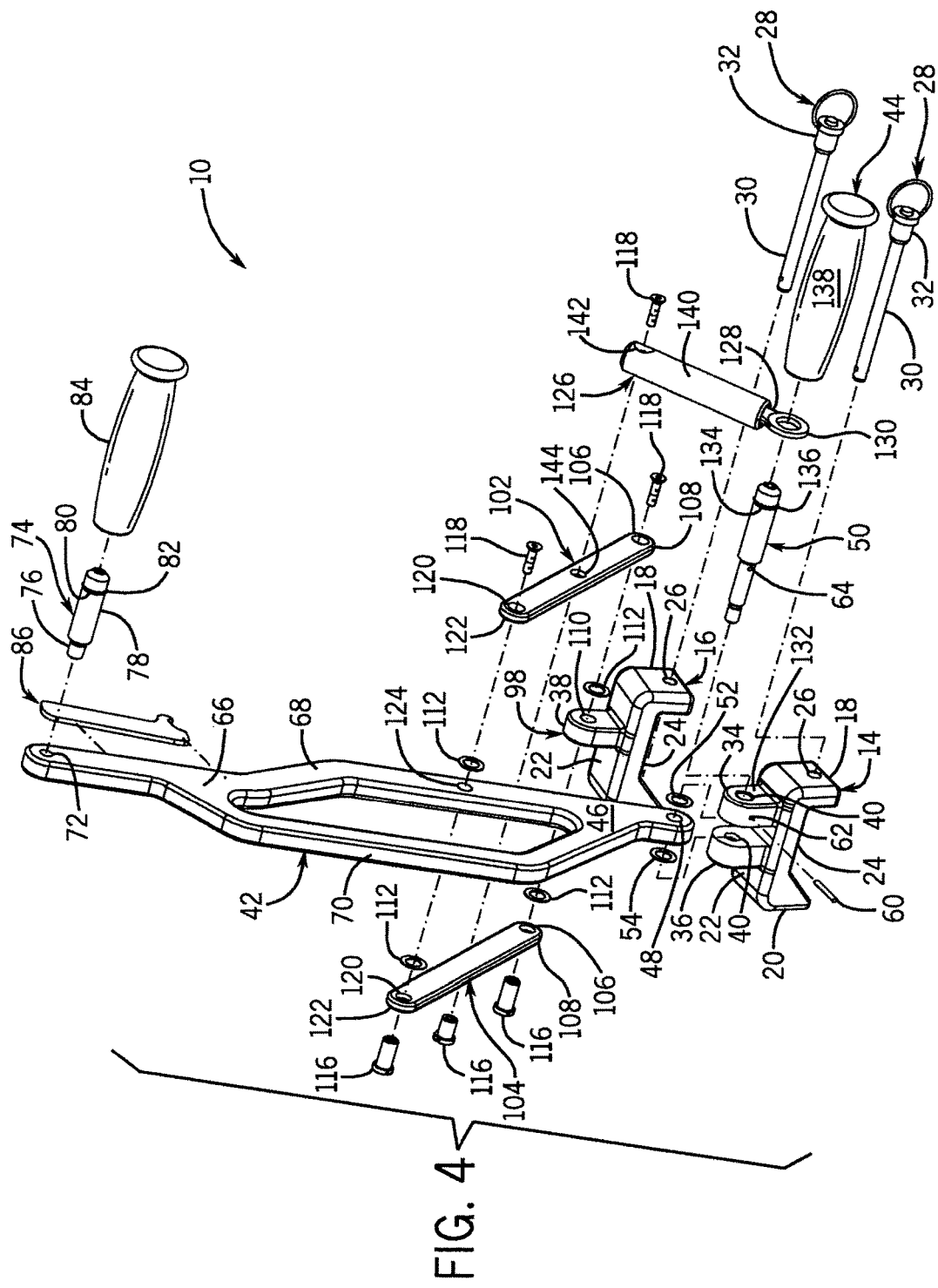

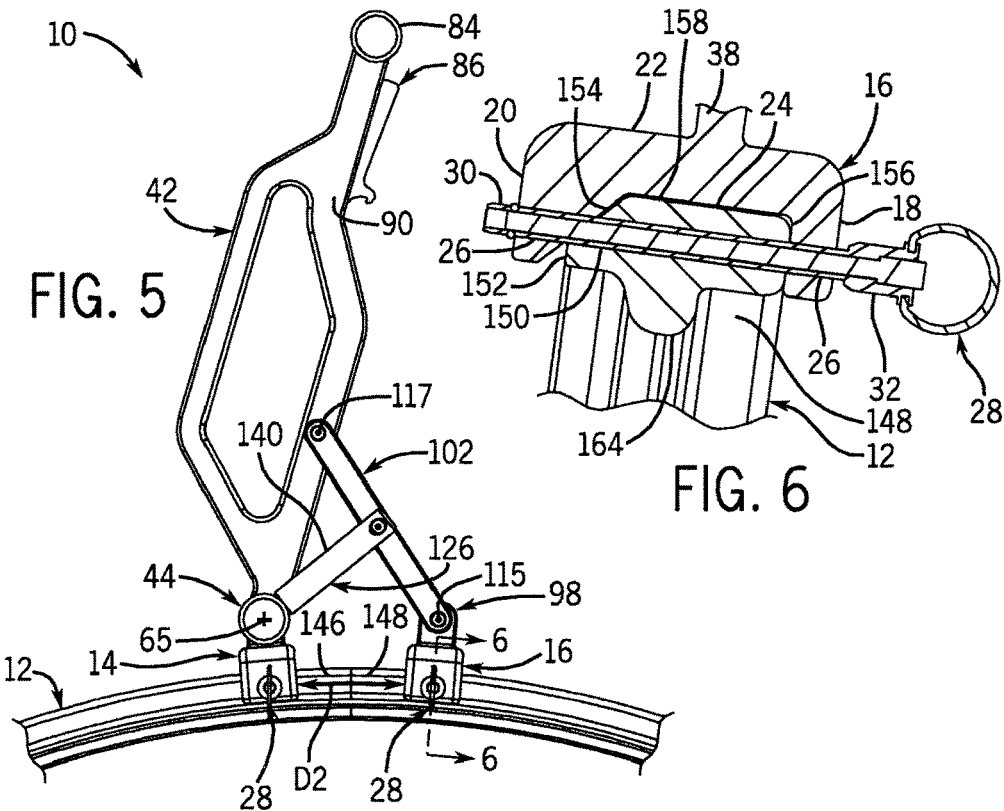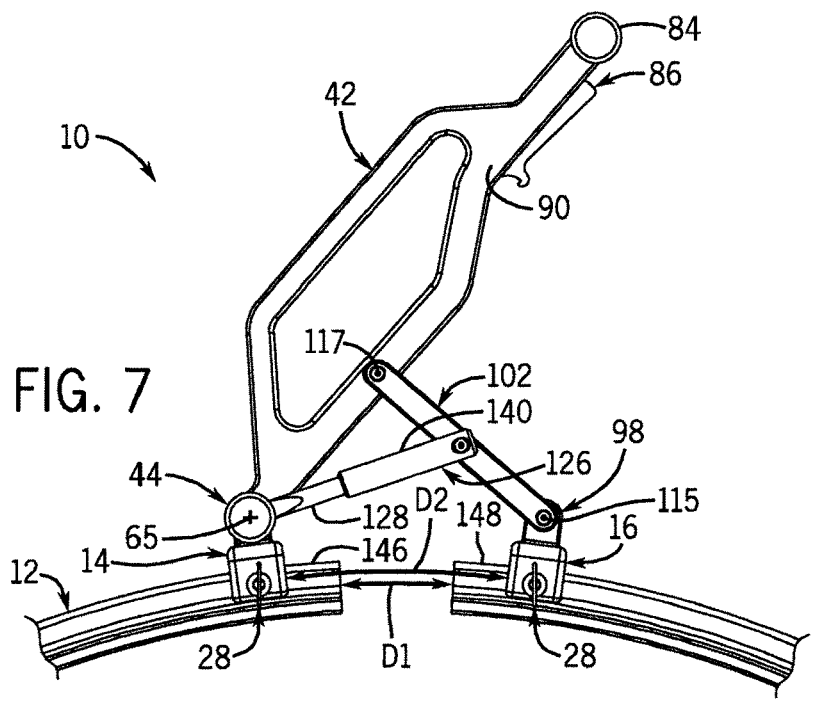

LOCK RING SPREADER

CROSS-REFERENCE TO RELATED APPLICATIONS

This application represents the U.S. National Stage of International Application No. PCT/US2013/060337, filed Sep. 18, 2013 which claims the priority benefit of U.S. Provisional Application No. 61/703,441 filed Sep. 20, 2012, which is hereby incorporated by reference as if fully set forth herein.

STATEMENT REGARDING FEDERALLY SPONSORED RESEARCH

Not Applicable.

BACKGROUND OF THE INVENTION

The present invention relates to lock rings, and more particularly to a device and a method for installing and uninstalling a lock ring.

Lock rings are used in a wide variety of applications to axially restrain a tire and associated rim components that are mounted to a rim. After the tire has been mounted to the rim, the lock ring is installed by opening (i.e., the ends are spread apart to enlarge the overall diameter of the lock ring) and moving the lock ring over the rim. The rim includes an annular gutter or recess that is sized to receive the lock ring on the rim. The lock ring, once aligned with the annular gutter, is then closed (i.e., the ends are allowed to spring back toward their natural position) so that the lock ring is seated in the annular gutter, is biased toward the rim, and is axially restrained on the rim. To uninstall the lock ring, the lock ring is opened, unseated from the gutter, and removed from the rim.

Lock rings can be sized for use with rims ranging from less than twelve inches to over sixty-four inches in diameter. Lock rings, especially those at the larger end of the spectrum, can require a substantial amount of force to spread apart the ends. Even with smaller lock rings, other factors make it challenging to quickly and easily install and uninstall lock rings. Ergonomics of the installation can present impediments to manipulating the lock ring. For instance, installation and removal is often performed in the field (e.g., at a work site, such as a remote mine) and is subject to the current conditions (e.g., extreme temperatures, rain, etc.). In addition, those manipulating the lock ring are typically wearing thick gloves and often must maneuver the lock ring within a relatively limited envelope (e.g., larger tires may be mounted/dismounted while the rim remains bolted to the vehicle). Economic factors further drive a desire for efficient wheel repair because an idle machine, such as a dump truck having a capacity exceeding three hundred and fifty tons, has a substantial opportunity cost associated with each minute of unproductive downtime.

In light of at least the above, a need exists for a device that allows for efficient manipulation of a lock ring.

SUMMARY OF THE INVENTION

In one aspect, a lock ring spreader is capable of being mounted to a lock ring having a first end and a second end. The lock ring spreader comprises a first mount that is mountable to the lock ring near the first end of the lock ring and a second mount that is mountable to the lock ring near the second end of the lock ring. A crank arm is pivotally coupled to the first mount and extends radially outward from the first mount relative to the lock ring. A link arm is pivotally coupled to the second mount and the crank arm, and extends radially outward from the second mount relative to the lock ring. Pivoting the crank arm radially inward relative to the lock ring pivots the link arm relative to the crank arm and expands the distance between the first mount and the second mount.

In another aspect, a lock ring spreader is capable of being mounted to a lock ring defining a first end, a second end opposite to the first end, a first axial face, a second axial face opposite to the first axial face, and an outer radial face between the first axial face and the second axial face. The lock ring spreader comprises a first mount that is mountable to the lock ring near the first end of the lock ring, the first mount is configured to substantially conform to at least one of the first axial face, the second axial face, and the outer radial face. A second mount is mountable to the lock ring near the second end of the lock ring, the second mount is configured to substantially conform to at least one of the first axial face, the second axial face, and the outer radial face. A crank arm has a first end that is pivotally coupled to the first mount near the first end. A link arm has a first end and a second end, the link arm is pivotally coupled to the second mount near the first end and to the crank arm near the second end. Pivoting the crank arm radially inward toward the second mount relative to the lock ring pivots the link arm relative to the crank arm and expands a distance between the first mount and the second mount.

In a further aspect, a lock ring spreader is capable of being mounted to a lock ring having a first end and a second end. The lock ring spreader comprises a first mount that is mountable to the lock ring near the first end of the lock ring and a second mount that is mountable to the lock ring near the second end of the lock ring. A crank arm is pivotally coupled to the first mount about a first axis. A link arm is pivotally coupled to the second mount about a second axis and to the crank arm about a third axis. The second axis is closer to a central axis of the lock ring than the third axis when the lock ring spreader is mounted to the lock ring. Pivoting the crank arm about the first axis (between a first position and a second position) pivots the link arm about the second axis and the third axis.

In yet another aspect, an assembly comprises a rim having an annular gutter formed in a radially outer surface and a tire mounted to the rim. A bead seat band is mounted on the rim adjacent to the tire. A lock ring has a first end and a second end, the lock ring is configured to selectively engage the annular gutter and axially restrain the bead seat band on the rim. A lock ring spreader has a first mount that is coupled to the first end of the lock ring, a second mount that is coupled to the second end of the lock ring, a crank arm that is pivotally coupled to the first mount and extends radially outward from the first mount relative to the lock ring, and a link arm that is pivotally coupled to the second mount and the crank arm and extends radially outward from the second mount relative to the lock ring. Pivoting the crank arm radially inward relative to the lock ring pivots the link arm relative to the crank arm and expands a distance between the first mount and the second mount to disengage the lock ring from the annular gutter.

In a further aspect, a method of using a lock ring spreader to install and uninstall a lock ring from a gutter of a rim includes mounting a first mount of the lock ring spreader to the lock ring near a first end of the lock ring, mounting a second mount of the lock ring spreader to the lock ring near a second end of the lock ring, rotating a crank arm that is pivotally coupled to the first mount at a first axis about the first axis, rotating a link arm that is pivotally coupled to the second mount at a second axis and to the crank arm at a third axis about the second axis and the third axis. Rotating the crank arm about the first axis between a first position and a second position pivots the link arm about the second axis and the third axis, and expands a distance between the first mount and the second mount. The distance between the first mount and the second mount allows the lock ring to be installed and uninstalled from the gutter of the rim without the lock ring undergoing plastic deformation.

These and still other aspects will be apparent from the description that follows. In the detailed description, preferred example embodiments will be described with reference to the accompanying drawings. These embodiments do not represent the full scope of the concept; rather the concept may be employed in other embodiments. Reference should therefore be made to the claims herein for interpreting the breadth of the invention.

BRIEF DESCRIPTION OF THE DRAWINGS

FIG. 2 is a side view of the first example lock ring spreader.

FIG. 3 is a bottom view of the first example lock ring spreader.

FIG. 4 is an isometric, exploded view of the first example lock ring spreader.

FIG. 5 is a side view of the first example lock ring spreader illustrated in FIG. 1 mounted to an example lock ring and in an unlocked position.

FIG. 6 is a partial cross section along line 6-6 shown in FIG. 5.

FIG. 7 is a side view of the first example lock ring spreader mounted to the example lock ring and in an intermediate position.

DETAILED DESCRIPTION

Figure 1:
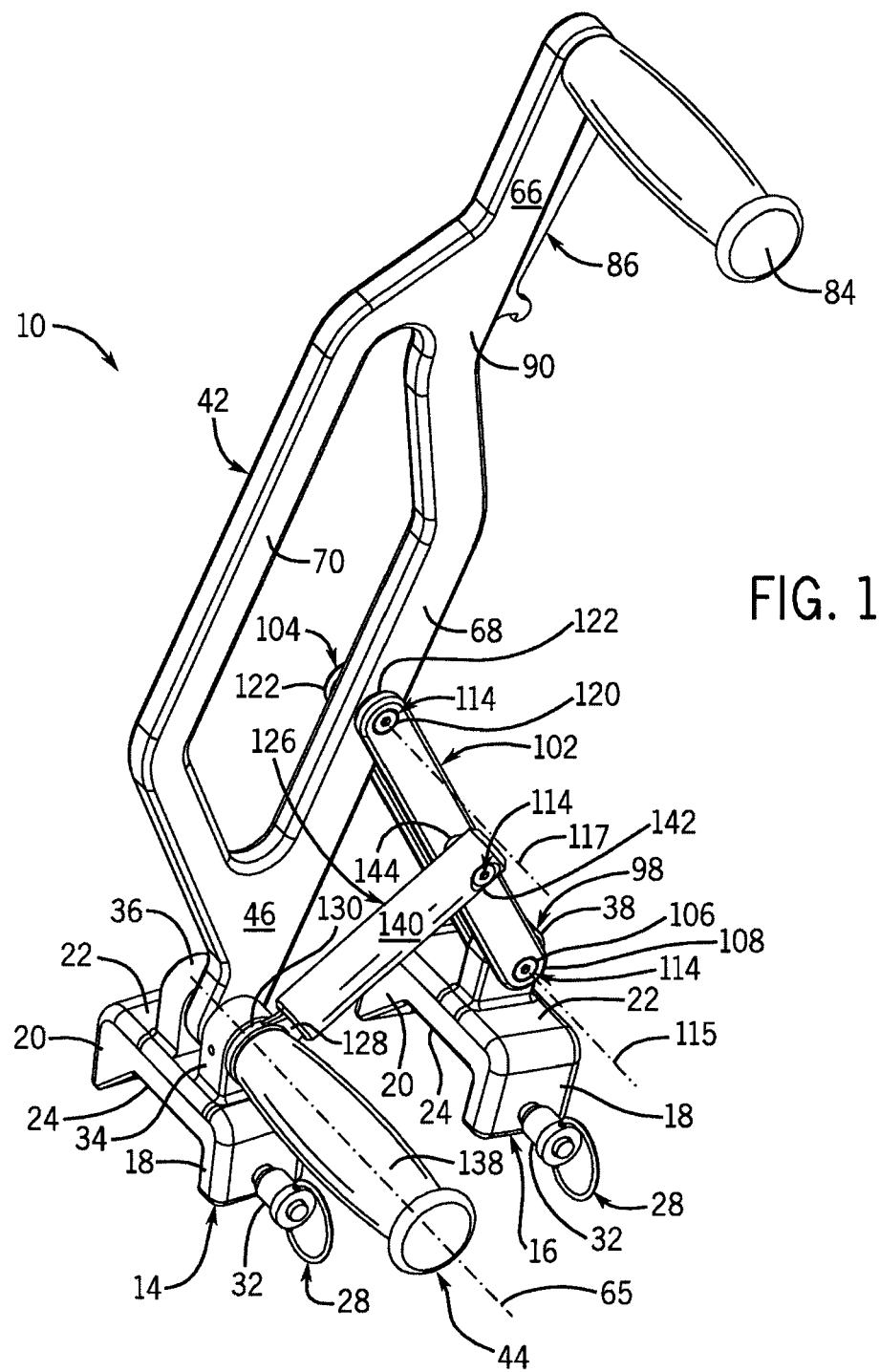
FIG. 1 is an isometric view of a first example lock ring spreader.

The example bead seat band lock ring spreaders are described in connection with example lock rings for locking the bead seat bands on a wheel or rim to retain a tire on the rim. However, as one skilled in the art will appreciate when given the benefit of this disclosure, the lock ring spreader concept can be adapted to engage other bead seat band lock ring forms, such as the various lock rings manufactured by GKN Wheels Armstrong of Armstrong, Iowa. Furthermore, the structure, size, and construction of the example lock ring spreaders can be adapted from the examples shown to accommodate specific application requirements (e.g., operating envelope restrictions, force requirements, cost constraints, etc.) without departing from the lock ring spreader concept. Throughout the description, terms such as front, back, side, top, bottom, up, down, upper, lower, inner, outer, above, below, and the like are used to describe the relative arrangement and/or operation of various components of the example embodiment; however, none of these relative terms are to be construed as limiting the construction or alternative arrangements that are within the scope of the claims.

FIGS. 1-4 show the construction of an example lock ring spreader 10. The lock ring spreader 10 can be mounted to a lock ring 12 (shown in FIGS. 5-9) and used to open (e.g., expand, spread, etc.) and close (e.g., retract, collapse, etc.) the lock ring 12. Specifically, when the lock ring spreader 10 is moved from an unlocked position (shown in FIGS. 1-3 and 6) to a locked position (shown in FIG. 9), the lock ring 12 is expanded from a closed position to an open position at which the interior diameter of the lock ring 12 is larger. The lock ring 12 is then more easily positioned over a rim of a wheel assembly and aligned with an annular gutter formed in the rim. With the lock ring 12 in position, the lock ring spreader 10 is moved to the unlocked position and the lock ring 12 springs back toward a natural position where it is then seated in the annular gutter to axially restrain the tire on the rim.

The lock ring spreader 10 is secured or mounted to the lock ring 12 by a first mount 14 and a second mount 16. The example first mount 14 includes a pair of legs 18, 20 that are connected along a top by a bridge 22. An underside of the first mount 14 defines a generally U-shaped recess 24. One of the legs 20 tapers from the bridge 22 so that the recess 24 is configured to conform to the contours of the lock ring 12. The recess 24 may be contoured to engage the specific form of a mating lock ring. Each leg 18, 20 further includes a pair of aligned, transverse holes 26. The holes 26 are positioned beneath the bridge 22 and are configured to receive a mounting pin 28. Specifically, a shaft 30 of the mounting pin 28 is inserted into the holes 26 until a head 32 of the mounting pin 28 is near one of the legs 18. The example mounting pins 28 shown include a spring-loaded ball that protrudes radially outward from the shaft 30 so that the ball can retract into the shaft 30 when sufficient axial force is applied to move the mounting pin 28 into the holes 26. The ball also inhibits the mounting pin 28 from being removed from the holes 26 without sufficient force. While the mounting pins 28 provide for convenient mounting and dismounting, the first mount 14 and the second mount 16, in other forms, can be bolted or otherwise secured to the lock ring 12.

The first mount 14 and the second mount 16 differ in that the first mount 14 includes a pair of parallel projections 34, 36 extending upward from the bridge 22, whereas the second mount 16 includes a single projection 38 that extends upward from the bridge 22 of the second mount 16. All of the projections 34, 36, 38 have generally rectangular bases and extend upward to a rounded tip. Each of the projections 34, 36 on the first mount 14 includes a transverse hole 40 used to mount a crank arm 42 and a handle 44 to the first mount 14. The first mount 14 and the second mount 16 may be of various other constructions. For instance, the mounts 14, 16 can be generally rectangular bars, each having an end mounted (e.g., bolted) to the lock ring 12 and a pivot formed at an opposite end to accommodate the remaining components. Alternatively, the mounts 14, 16 can be L-shaped with one leg fixed to the lock ring 12 and the other leg pivotally coupled to the remaining components.

Shown best in FIG. 4, the crank arm 42 is pivotally coupled to the first mount 14 between the projections 34, 36. Specifically, the crank arm 42 defines a first end 46 that includes an opening 48. The opening 48 in the first end 46 of the crank arm 42 is aligned with the holes 40 formed in the projections 34, 36. A shoulder pin 50 is then inserted into the holes 40 and the opening 48 to pivotally couple the crank arm 42 to the first mount 14. A pair of washers 52, 54 are also installed on the shoulder pin 50 between side faces of the crank arm 42 and the projections 34, 36. The shoulder pin 50 is restrained to the first mount 14 by a pin 60 that is press fit into a cylindrical passage 62 formed in the projection 34 that intersects the hole 40. The pin 60 extends into another cylindrical passage 64 that is formed through the shoulder pin 50, thereby coupling the shoulder pin 50 to the first mount 14. When assembled, the crank arm 42 is pivotally coupled to the first mount 14 about a first pivot axis 65.

The example crank arm 42 has a generally rectangular cross section and extends from the first end 46 to a second end 66. Between the first end 46 and the second end 66, the crank arm 42 diverges into two segments 68, 70. Another opening 72 is formed near the second end 66 and is configured to receive a handle pin 74. The handle pin 74 includes a smaller diameter portion 76 that can be threaded into the mating opening 72 or, for instance, can be knurled and press-fit into the opening 72. A larger diameter portion 78 also includes an annular groove 80 into which a clip 82 is seated. The clip 82 protrudes radially outward from the larger diameter portion 78 to restrain a handle grip 84 on the handle pin 74. The handle grip 84 includes a series of serrated internal rings that cam against the clip 82 as the handle grip 84 is installed on the handle pin 74, but catch against the clip 82 when attempting to remove the handle grip 84 from the handle pin 74.

Figure 10:
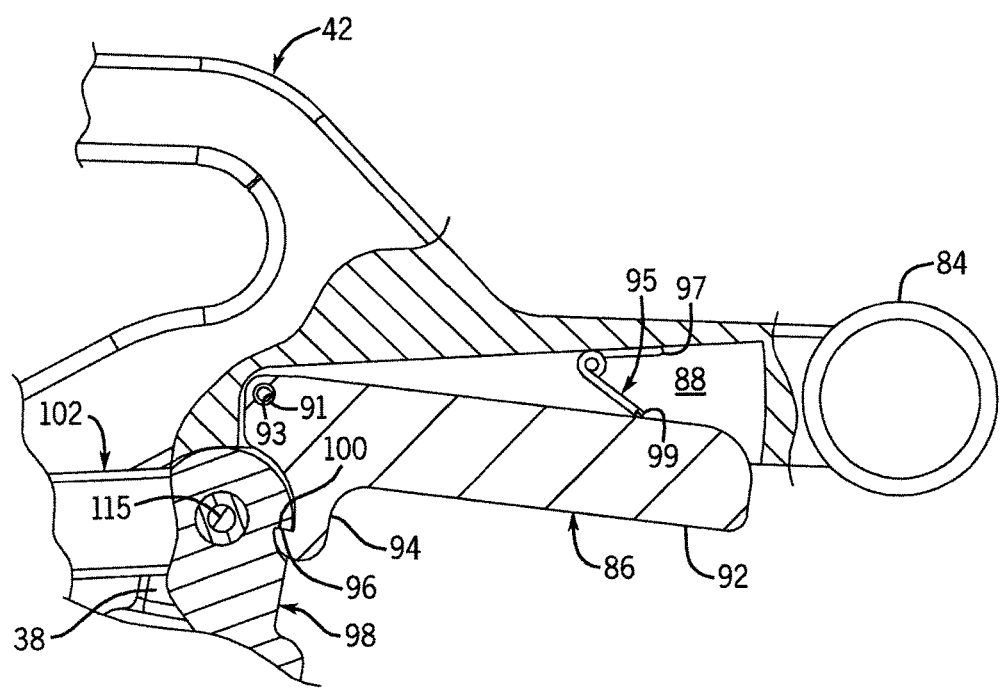
FIG. 10 is a partial cross section of the first example lock ring spreader illustrating a first example latch assembly.
Figure 11:
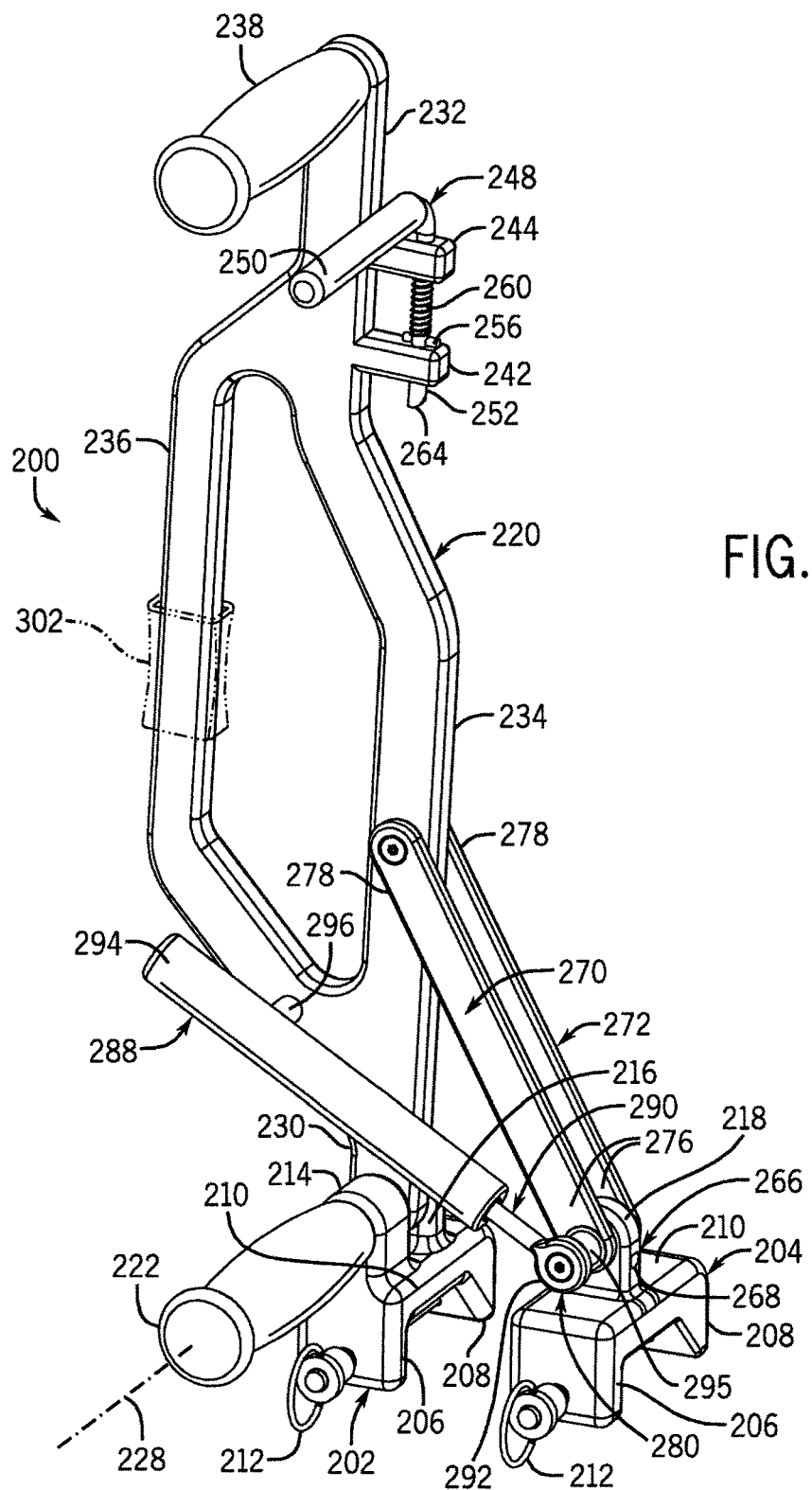
FIG. 11 is a front isometric view of a second example lock ring spreader.

The crank arm 42 includes a cavity 88 (shown in FIG. 10) into which a first latch member 86 is mounted. The first latch member 86 is pivotally mounted within the cavity 88 about a latch pivot 90, such as by a spring pin 91 seated within an opening 93. A torsion spring 95 is also seated within the cavity 88 to bias the first latch member 86 clockwise (as shown in FIG. 10) about the latch pivot 90. A first end 97 of the torsion spring 95 is secured to the crank arm 42 and a second end 99 cams against the first latch member 86. The first latch member 86 includes a grip portion 92 that can be grasped to pivot the first latch member 86 about the latch pivot 90. An engagement portion 94 includes a tooth 96 that is configured to selectively engage a second latch member 98 that is integrated into the second mount 16. As shown only in FIG. 10, the second latch member 98 includes a land 100 that is contoured to interface with the tooth 96 of the first latch member 86 when the first latch member 86 is in the locked position shown in FIG. 10.

The crank arm 42 is coupled to the second mount 16 through a pair of link arms 102, 104. The link arms 102, 104 have generally rectangular cross sections with rounded ends. Each of the link arms 102, 104 includes an opening 106 at a first end 108. The single projection 38 extending from the second mount 16 includes a transverse hole 110 that can be aligned with the opening 106 of each link arm 102, 104. Washers 112 are seated between the projection 38 and the link arms 102, 104, and a fastener assembly 114 pivotally couples the link arms 102, 104 to the second mount 16 about a second pivot axis 115. The fastener assembly 114 is shown to include a barrel fastener 116 having internal threads that mate with external threads of a fastener 118. Once the fastener assembly 114 is engaged the link arms 102, 104 are pivotally captured to the second mount 16. Each link arm 102, 104 includes another opening 120 near a second end 122 so that the second end 122 of each link arm 102, 104 can be pivotally mounted to the crank arm 42 about a third pivot axis 117. More specifically, the lower segment 68 of the crank arm 42 has an opening 124 for pivotally mounting the second end 122 of each link arm 102, 104. The link arms 102, 104 are positioned to flank the side faces of the crank arm 42. Another fastener assembly 114 pivotally couples the link arms 102, 104 to the crank arm 42 and captures additional washers 112.

An example dampener 126 is pivotally mounted to both the first mount 14 and the link arm 102. The dampener 126 includes a rod 128 near a first end that defines a ring 130 sized to fit over the shoulder pin 50 and abut an outside face 132 of the projection 34. The shoulder pin 50 also includes an annular recess 134 and a clip 136 that is seated in the recess 134. The clip 136 protrudes radially outward from the shoulder pin 50 to restrain a handle grip 138 on the shoulder pin 50, thus capturing the rod 128 of the dampener 126. The handle grip 138 includes a series of serrated internal rings that cam against the clip 136 as the handle grip 138 is installed, but catch against the clip 136 when attempting to remove the handle grip 138 from the shoulder pin 50.

The dampener 126 is pivotally coupled at a second end to the link arm 102. Specifically, a cylinder portion 140 of the dampener 126 includes a transverse opening 142 that is aligned with a hole 144 formed through the link arm 102 between the first end 108 and the second end 122 of the link arm 102. A fastener assembly 114 pivotally couples the cylinder portion 140 to the link arm 102. The dampener 126 can be a hydraulic dampener, a pneumatic dampener, etc. that provides one- or two-way resistance to relative movement, so that when the lock ring spreader 10 is moved toward the unlocked position, the dampener 126 provides resistance to this movement to inhibit the lock ring 12 from closing faster than desired for a particular application. Furthermore, the dampener 126 can be mounted to other components of the lock ring spreader 10, such as between the crank arm 42 and the second mount 16.

The first mount 14, the second mount 16, the crank arm 42, the link arms 102, 104, the shoulder pin 50, and the handle pin 74 may be made of metal, plastic, composites, or any other material suitable in view of the ultimate application requirements.

FIG. 5 shows the lock ring spreader 10 mounted near ends 146, 148 of the lock ring 12. The first mount 14 is mounted near one end 146 and the second mount 16 is mounted near the second end 148 by respective mounting pins 28. Each end 146, 148 of the lock ring 12 includes an opening 150 that extends laterally through the lock ring 12 and is sized to allow the mounting pin 28 to pass through. FIG. 6 shows a cross section through the second mount 16 mounted to the second end 148 by pin 28. The lock ring 12 includes a first axial face 152 (including an angled portion 154), a second axial face 156, and an outer radial face 158. The outer radial face 158 connects the first axial face 152 and the second axial face 156. The opening 150 extends through the first axial face 152 and the second axial face 156, so that the holes 26 in the legs 18, 20 are aligned with the opening 150 when the second mount 16 is engaged with the lock ring 12. The underside of the second mount 16 (i.e., the generally U-shaped recess 24) is configured to substantially conform to the first axial face 152, the outer radial face 158, and the second axial face 156. The term "conform" generally implies an engagement between the mounts 14, 16 and the lock ring 12 that inhibits relative movement between each respective mount 14, 16 and the lock ring 12, such that movement of the mounts 14, 16 results in movement of the lock ring 12.

Figure 8:
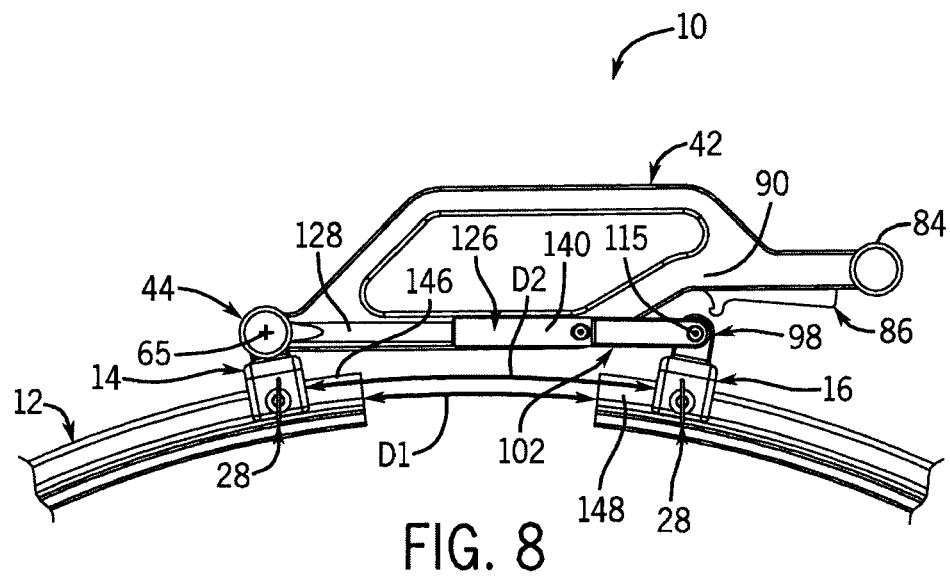
FIG. 8 is a side view of the first example lock ring spreader mounted to the example lock ring and in an over-center position.
Figure 9:
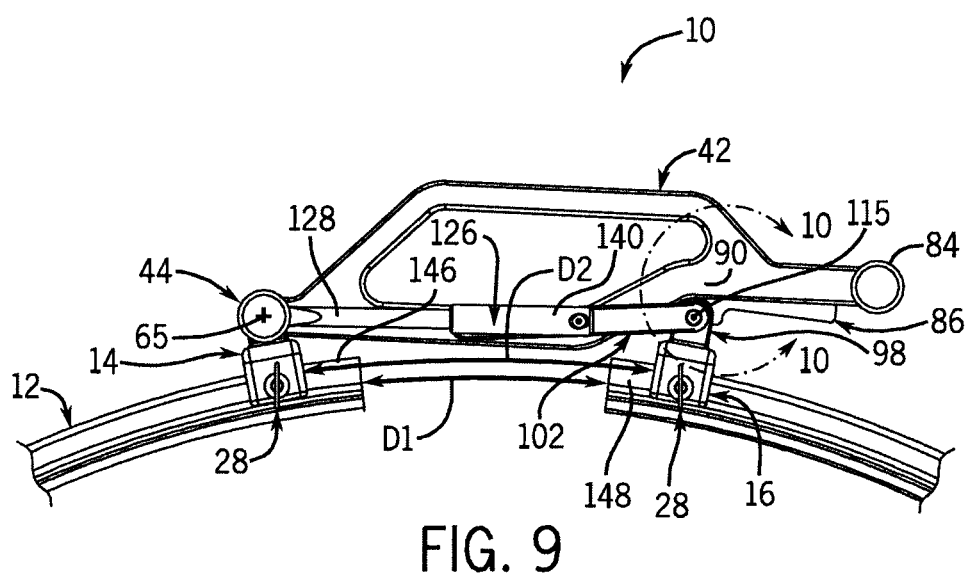
FIG. 9 is a side view of the first example lock ring spreader mounted to the example lock ring and in a locked position.

With the first mount 14 and the second mount 16 mounted or secured to the respective ends 146, 148 of the lock ring 12, the lock ring spreader 10 can be manipulated to alter a distance D1 between the ends 146, 148 of the lock ring 12 (shown greater than zero in FIGS. 7-9). For instance, the distance D1 can be altered or adjusted between approximately zero (i.e., when the ends 146, 148 are in contact) to any application-specific distance or separation required to mount the open lock ring 12 on a rim. Shown in FIG. 8, the maximum distance D1 between the ends 146, 148 of the lock ring 12 is established when the lock ring spreader 10 is fully spread (i.e., when the lock ring spreader is in the over-center position). The specific value of this distance D1 is application specific, with the general limitation that the distance D1 does not result in plastic deformation of the lock ring 12.

FIGS. 5, 7, 8, and 9 show the lock ring spreader 10 being manipulated from the unlocked position in FIG. 5, to an intermediate position in FIG. 7, to an over-center position in FIG. 8, to a locked position in FIG. 9. Similarly, the lock ring 12 is shown moving from a closed position in FIG. 5 (at which there is little or no distance D1 between the ends 146, 148 of the lock ring 12) to an open position in FIG. 9 (at which the distance D1 between the ends 146, 148 has been increased so that the lock ring 12 can be mounted on a rim). Since the mounts 14, 16 are shown coupled to the ends 146, 148 of the lock ring 12, the distance D1 between the ends of the lock ring 12 is related to a distance D2 defined between the mounts 14, 16. In the example lock ring spreader 10, mounts 14, 16 are spaced apart by the distance D2 even when the ends 146, 148 of the lock ring 12 are in contact. However, the specific mounting location of each mount 14, 16 relative to the ends 146, 148 of the lock ring 12 can be adjusted as desired.

In use, an operator generally grasps the handle grips 84, 138 and applies a force to rotate the crank arm 42 clockwise (as viewed in FIG. 5) about the first pivot axis 65 defined by the first mount 14, moving the lock ring spreader 10 and the lock ring 12 toward the orientation shown in FIG. 7. The link arms 102, 104 begin to pivot at the first ends 108 counterclockwise about the second pivot axis 115 defined by the second mount 16. The link arms 102, 104 also pivot relative to the crank arm 42 at the second ends 122 about the third pivot axis 117. This movement increases the distance between the mounting locations of the dampener 126 on the shoulder pin 50 and the link arm 102. The dampener 126 can be configured to provide resistance to this expansion or may allow expansion with minimal resistance.

The lock ring 12 typically resists opening or expanding and urges the ends 146, 148 toward each other to a "natural position" (i.e., the position of the lock ring 12 when external forces are not applied). In some instances, the natural position may urge the ends 146, 148 past each other (e.g., where the lock ring 12 has overlapped itself). The dampener 126 is included to resist movement of the ends 146, 148 back to the natural position once the lock ring 12 has begun to open. The dampener 126 inhibits rapid closing of the lock ring 12, allowing for more controlled movement of both the lock ring 12 and the lock ring spreader 10.

Once the lock ring spreader 10 is pivoted to the orientation shown in FIG. 8, the lock ring spreader has reached a "soft lock" whereat the lock ring spreader 10 is near an over-center position. Specifically, the force provided by the "spring" force of the lock ring 12 that urges the ends 146, 148 toward each other will act to urge the lock ring spreader 10 toward the locked position shown in FIG. 9 once the lock ring spreader 10 has moved past the over-center position.

The lock ring spreader 10 also includes a "hard lock" when positioned as shown in FIGS. 9 and 10. The example hard lock includes the first latch member 86 pivotally mounted to the crank arm 42 and the second latch member 98 integrated into the second mount 16. The tooth 96 on the engagement portion 94 of the first latch member 86 may be urged into contact with the land 100 of the second latch member 98 by the torsion spring 95, an elastomeric member seated within the cavity 88, or other resilient/biasing members.

The open lock ring 12 and the locked lock ring spreader 10 can be positioned over an annular gutter formed in a rim. An inner radial face 164 of the lock ring 12 (shown in FIG. 6) is positioned adjacent to the gutter and the lock ring spreader 10 is unlocked. To unlock the first latch member 86 and the second latch member 98, force is applied to the grip portion 92 of the first latch member 86 to pivot the tooth 96 about the latch pivot 90 clear of the land 100. The inherent spring force of the lock ring 12 will urge the ends 146, 148 of the lock ring toward each other, but the dampener 126 will inhibit or retard this movement as the ends of the dampener 126 are urged closer.

Other "hard locks" may be incorporated into the lock ring spreader 10. For instance, the link arm 104 and the segment 68 of the crank arm 42 may include respective openings that are axially aligned when the lock ring spreader 10 is oriented as shown in FIG. 9. A lock pin can then be inserted into the openings to mechanically inhibit relative rotation of the link arm 104 relative to the crank arm 42 while the lock pin is in place. Alternatively, a locking ratchet can be integrated into the crank arm 42 at the first end 46, a hook can be pivotally coupled to the second mount 16 and be swung over the second end 66 when the crank arm 42 is near the second mount 16, or any other suitable locking structure/mechanism.

The construction of a second example lock ring spreader 200 is shown in FIGS. 11-17. The second example lock ring spreader 200 is similar to the first example lock ring spreader 10 described above, therefore, the following description focuses on the distinctions. Again, the lock ring spreader 200 can be mounted to the lock ring 12 (shown in FIGS. 5-9) and used to open (e.g., expand, spread, etc.) and close (e.g., retract, collapse, etc.) the lock ring 12 as the lock ring spreader 200 is moved between a locked position and an unlocked position.

The lock ring spreader 200 is secured or mounted to a lock ring (e.g., lock ring 12) by a first mount 202 and a second mount 204, which are similar to the mounts 14, 16 described with reference to the first example lock ring spreader 10. Each mount 202, 204 includes a pair of legs 206, 208 that are connected along a top by a bridge 210 and are configured to conform to the contours of the mating lock ring. The first mount 202 and the second mount 204 are selectively coupled to the lock ring via mounting pins 212.

Figure 13:
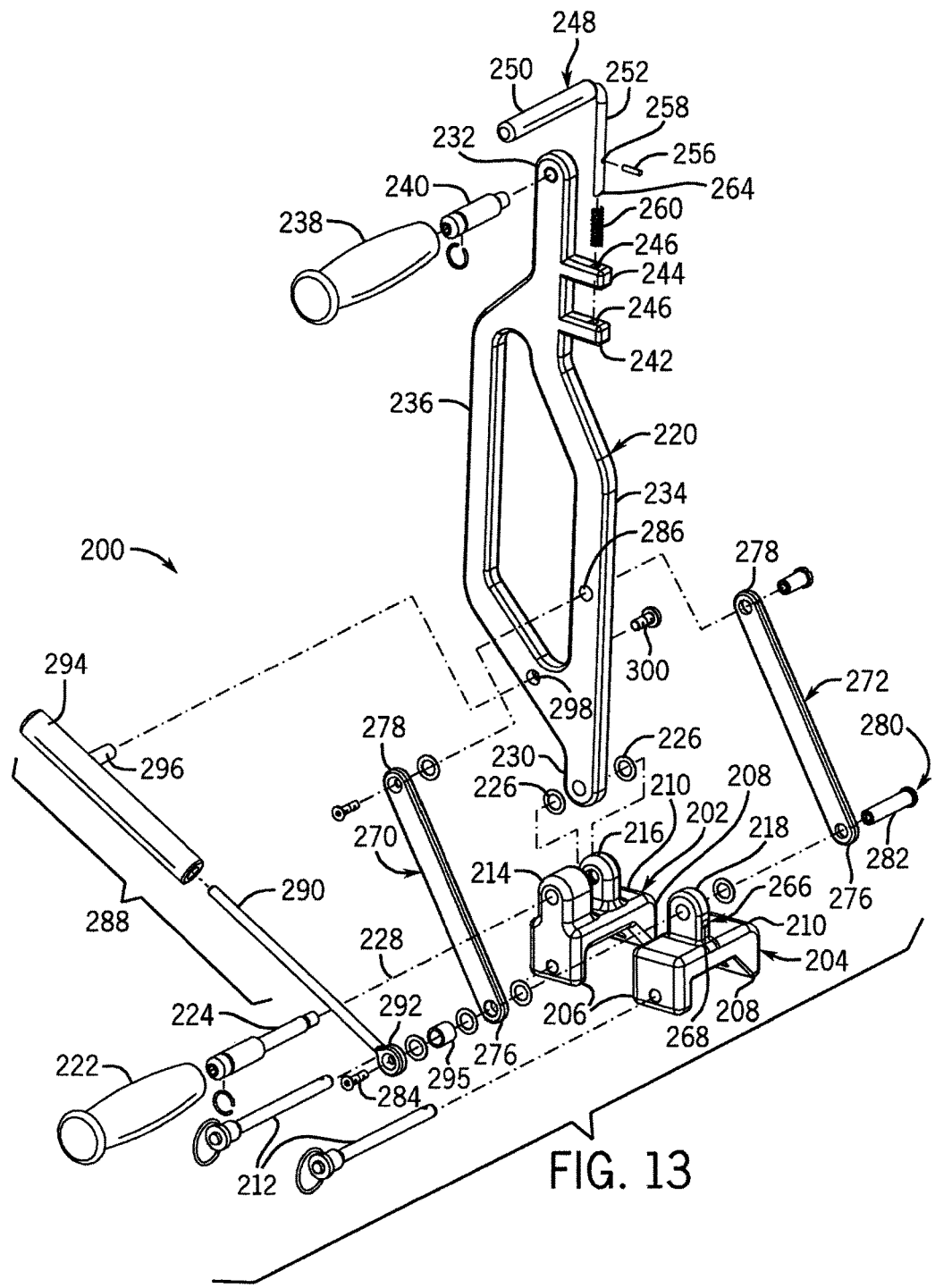
FIG. 13 is an isometric, exploded view of the second example lock ring spreader.
Figure 14:
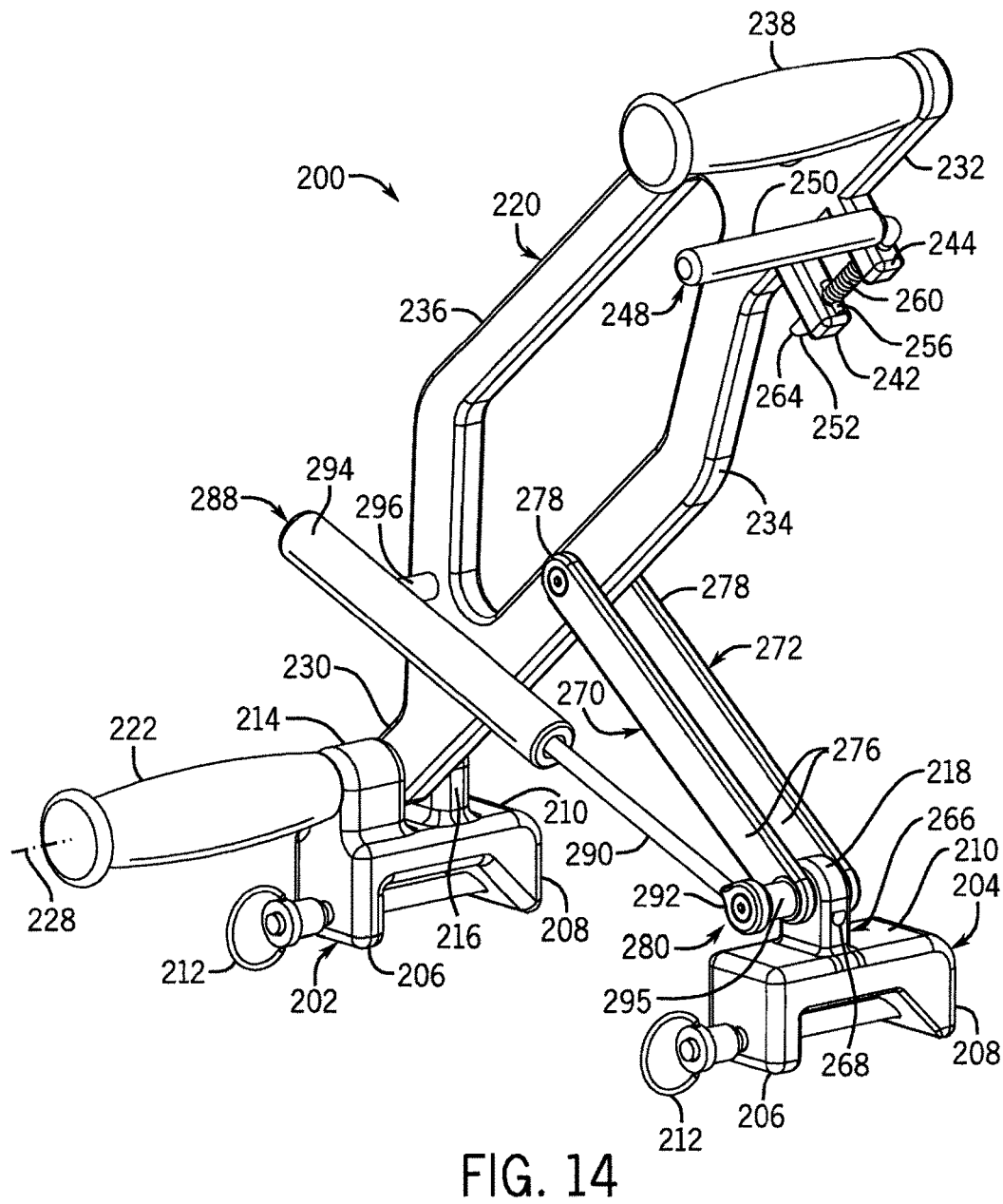
FIG. 14 is an isometric view of the second example lock ring spreader in an intermediate position.

Again, the first mount 202 and the second mount 204 differ in that the first mount 202 includes a pair of parallel projections 214, 216 extending upward from the bridge 210, whereas the second mount 204 includes a single projection 218 that extends upward from the bridge 210. As best shown in FIGS. 13 and 14, one of the pair of parallel projections 214 is wider than the other and is positioned flush with an outer side of the leg 206. A crank arm 220 and a handle 222 are mounted to the projections 214, 216 of the first mount 202.

The crank arm 220 is pivotally coupled to the first mount 202 about a first pivot axis 228 by a shoulder pin 224 and washers 226. The crank arm 220 extends from a first end 230 to a second end 232. Between the first end 230 and the second end 232, the crank arm 220 diverges into two segments 234, 236. A handle grip 238 is secured to a handle pin 240 that is secured to the second end 232 of the crank arm 220.

The crank arm 220 includes parallel mounts 242, 244 extending away from the second end 232. Each mount 242, 244 defines a keyed opening 246 into which a first latch member 248 is slidably mounted. The first latch member 248 includes a grip portion 250 that is oriented transverse to a latch arm 252. The grip portion 250 can be grasped to slide the first latch member 248 within the keyed opening 246. The example latch arm 252 has a generally D-shaped cross section with a flat top surface 254. The D-shaped cross section of the latch arm 252 is matched to the keyed opening 246 (also a D-shape) to inhibit the latch arm 252 from rotating within the keyed opening 246.

Figure 16:
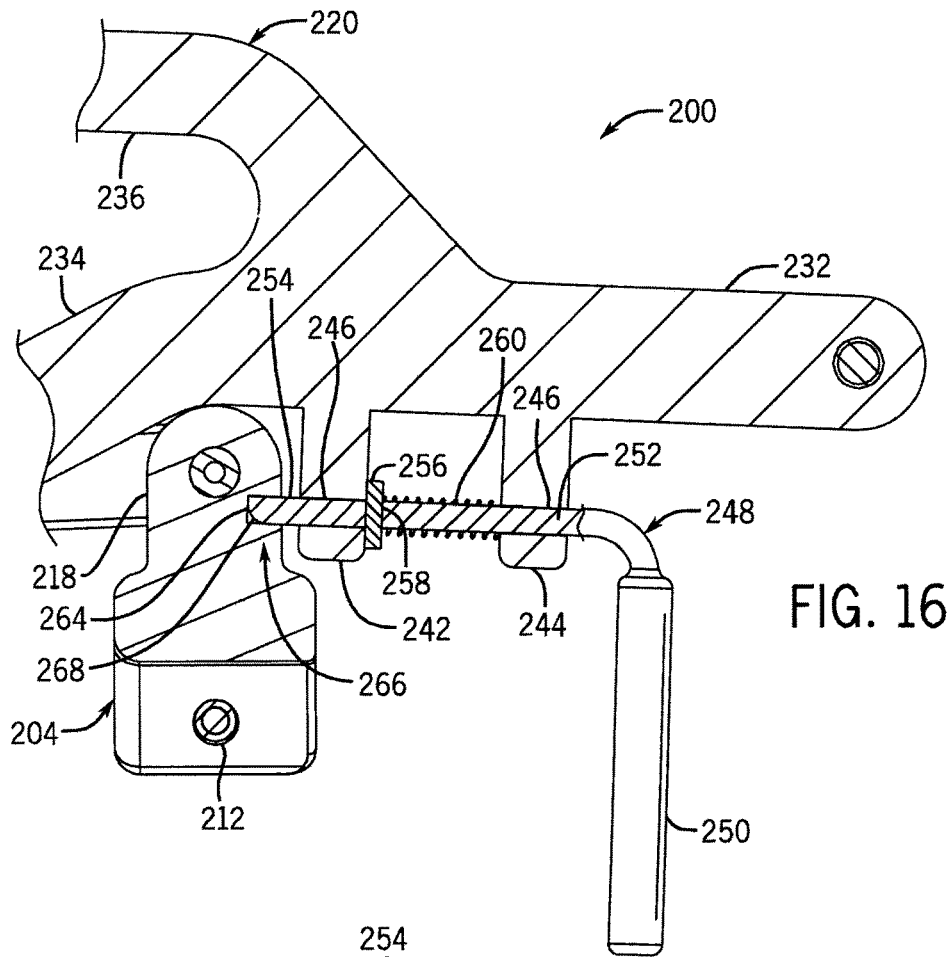
FIG. 16 is a partial cross section along line 16-16 shown in FIG. 15 illustrating a second example latch assembly in a locked position.
Figure 17:
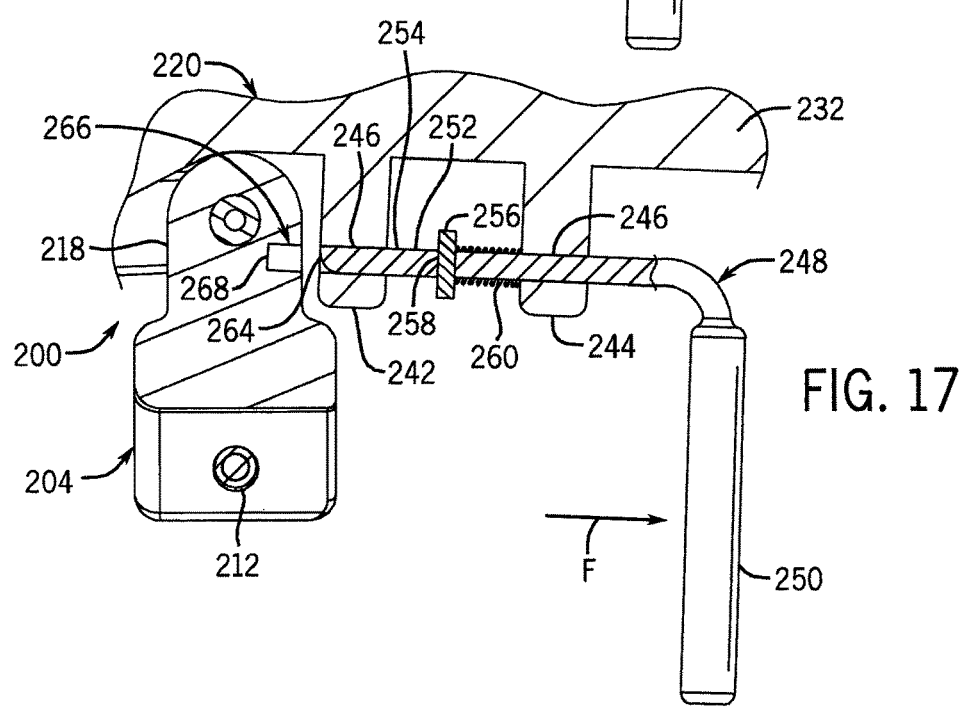
FIG. 17 is a partial cross section along line 16-16 shown in FIG. 15 illustrating the second example latch assembly in an unlocked position.

With specific reference to FIG. 16, the first latch member 248 is biased toward a locked position. A stop pin 256 is secured in a transverse hole 258 formed in the latch arm 252 to capture a spring 260 between the stop pin 256 and one of the mounts 244. The distal end of the latch arm 252 defines an engagement portion 264 that is rounded to cam against the projection 218 extending from the second mount 204. A second latch member 266 is formed in the projection 218 and defines a D-shaped recess 268 that is oriented to receive the engagement portion 264 of the latch arm 252 when the lock ring spreader 200 is in the locked position (i.e., the associated lock ring is spread open). To disengage or unlock the first latch member 248 and the second latch member 266, an operator can bias the grip portion 250 in the direction of arrow F shown in FIG. 17. Sliding the latch arm 252 as shown compresses the spring 260 and unseats the engagement portion 264 from the recess 268, thus allowing the crank arm 220 to pivot.

The crank arm 220 is coupled to the second mount 204 through a pair of link arms 270, 272. Each of the link arms 270, 272 extends between a first end 276 and a second end 278. The first end 276 is pivotally coupled to the second mount 204 via a fastener assembly 280 (i.e., a barrel fastener 282 having internal threads that mate with external threads of a fastener 284). The second end 278 of each link arm 270, 272 is pivotally mounted to the crank arm 220 at an intermediate opening 286.

Another example dampener 288 is pivotally mounted to both the second mount 204 and the crank arm 220. The dampener 288 includes a rod 290 having a ring 292 at an end that is pivotally secured to the second mount 204 via the fastener assembly 280. A spacer 295 provides clearance between the link arm 270 and the dampener 288. The dampener 288 is pivotally coupled at a second end to the crank arm 220. Specifically, a cylinder portion 294 of the dampener 288 includes a transverse standoff 296 that is aligned with and extends through a hole 298 formed through the crank arm 220. A fastener 300 engages the standoff 296 to pivotally capture the cylinder portion 294 to the crank arm 220. The dampener 288 is a pneumatic dampener having an annular gap or space between a head of the rod 290 and an interior surface (not shown) of the cylinder portion 294 such that the metering of air through the gap impedes relative movement between the rod 290 and the cylinder portion 294. As a result, the movement of the crank arm 220 relative to the mounts 202, 204 is controlled. In a preferred form, the dampener 288 does not provide substantial resistance (i.e., little more than nominal friction forces) as the rod 290 is being extended from the cylinder portion 294, and provides a metering resistance as the rod 290 is being retracted into the cylinder portion 294 (i.e., as the lock ring is being closed).

Figure 12:
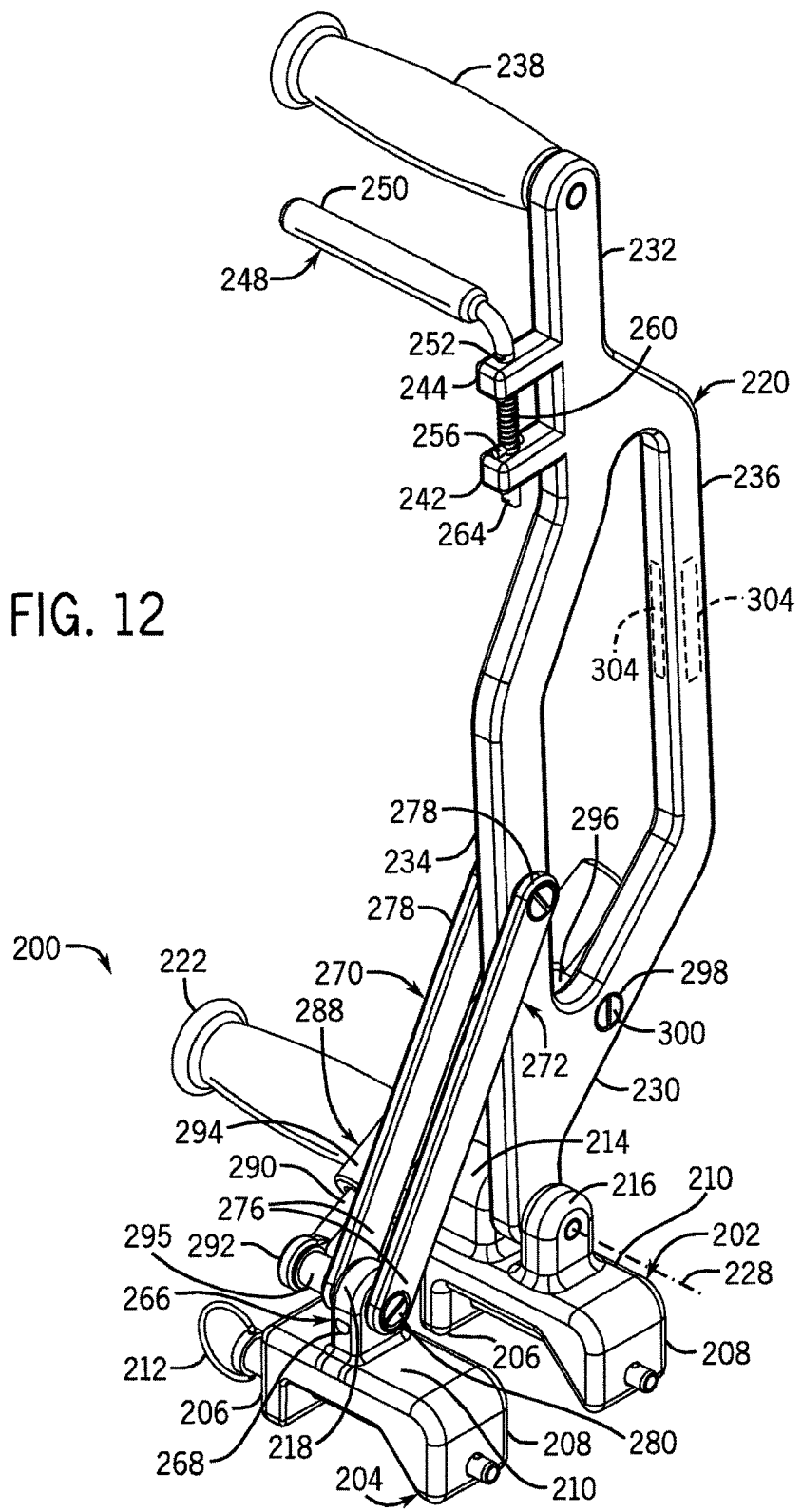
FIG. 12 is a rear isometric view of the second example lock ring spreader.
Figure 15:
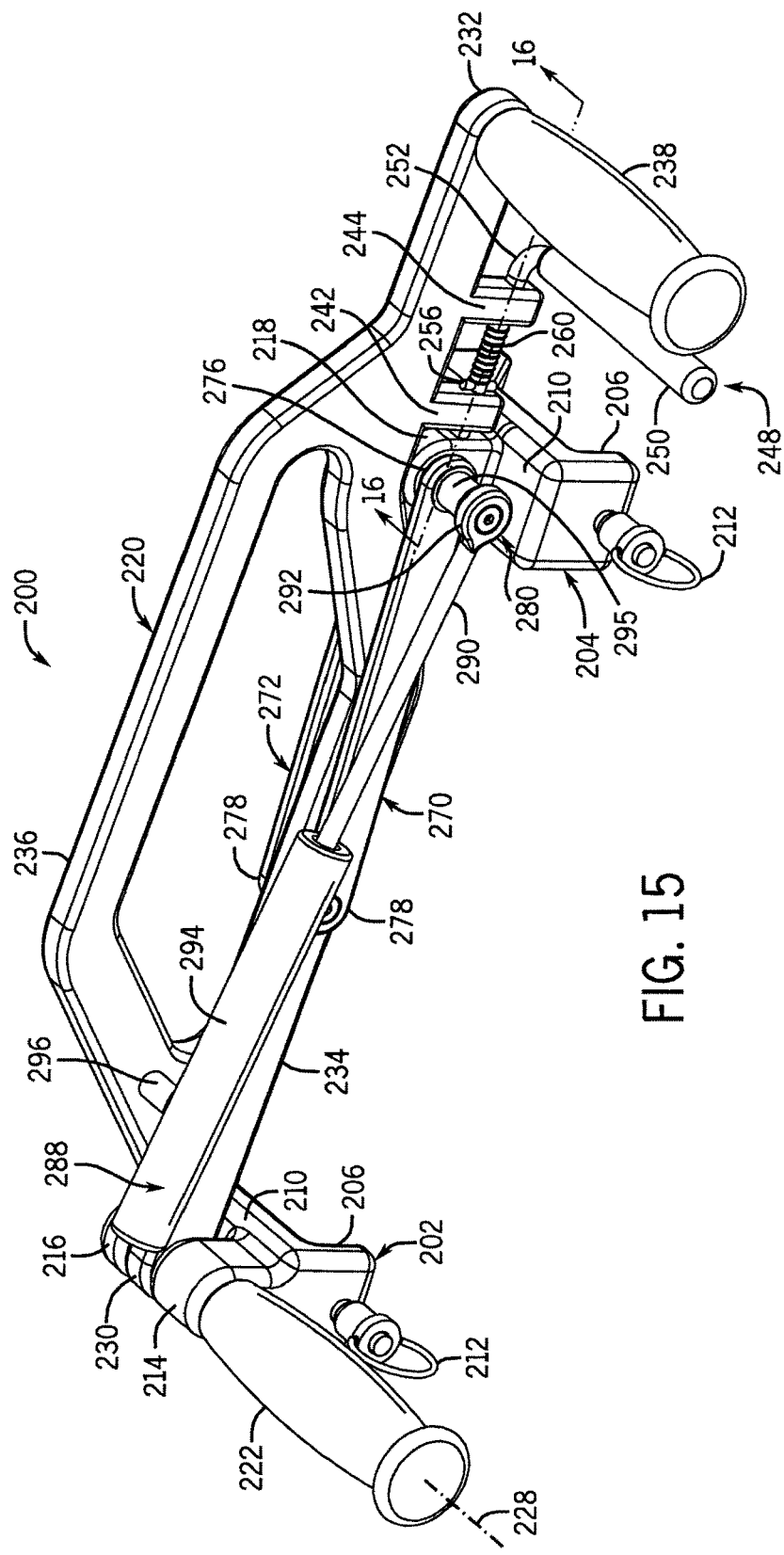
FIG. 15 is an isometric view of the second example lock ring spreader in a locked position.

The lock ring spreader 200 can be manipulated from an unlocked position in FIG. 12, to an intermediate position in FIG. 14, to an over-center and locked position in FIG. 15. As noted above, the lock ring spreader 200 includes an alternative example "hard lock" comprising the first latch member 248 and the second latch member 266. To further aid operation, the crank arm 220 may include an additional handle grip, such as an overmolded handle 302 (shown dashed in FIG. 11) or grip inserts 304 (shown dashed in FIG. 12) along the segment 236 of the crank arm 220.

Figures 18, 19, 20:
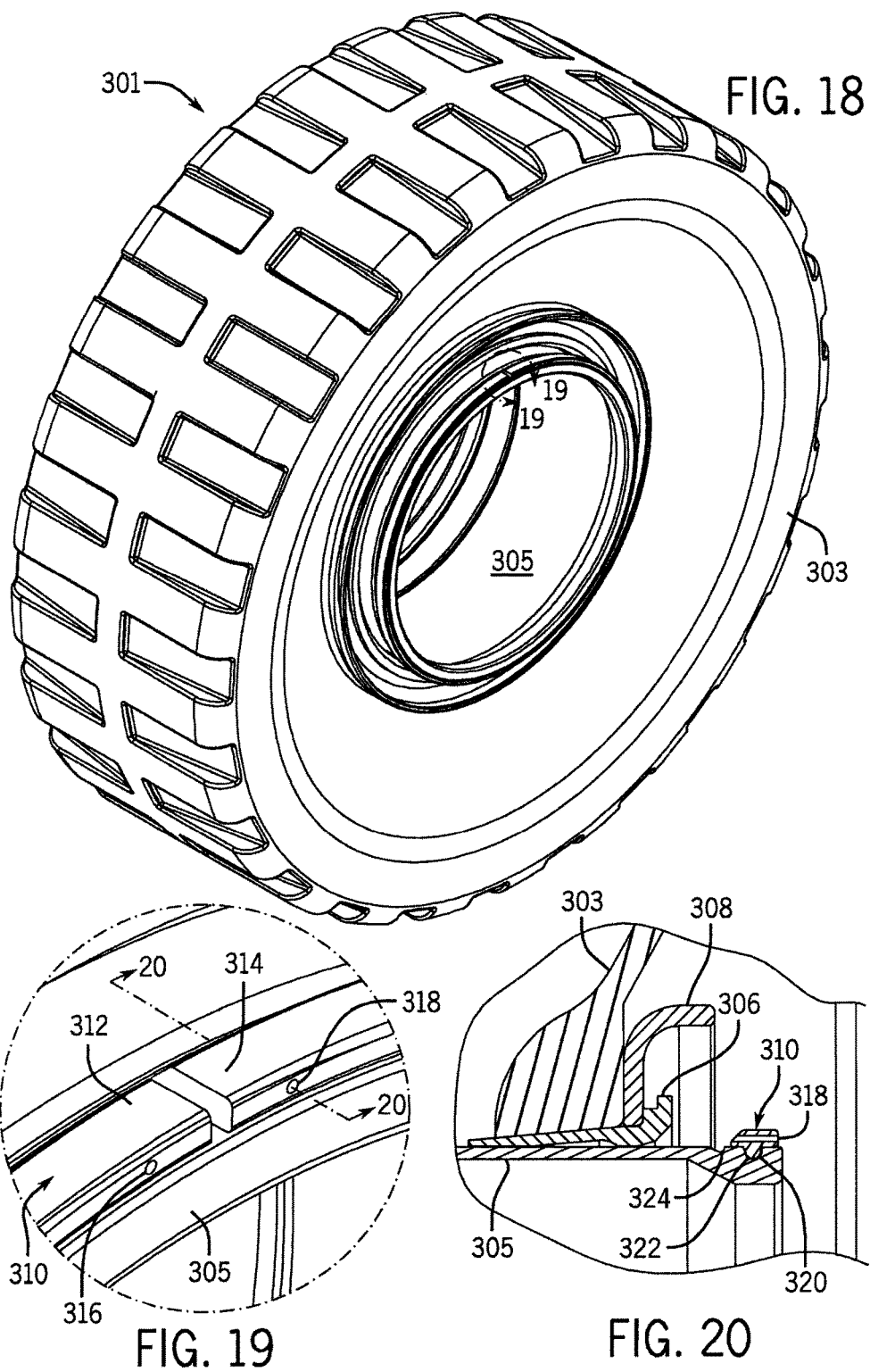
FIG. 18 is an isometric view of an example wheel assembly.
FIG. 19 is a detail view of a portion of the example wheel assembly circumscribed by arc 19-19 shown in FIG. 18.
FIG. 20 is a partial section view along line 20-20 shown in FIG. 19.

An example wheel assembly 301 is illustrated in FIGS. 18-20. The wheel assembly 301 includes a tire 303 that is mounted on a rim 305; the tire 303 is shown deflated prior to dismounting it from the rim 305. As best shown in FIGS. 19 and 20, the tire 303 and associated bead seat band 306 and flange 308 are spaced inward and away from a lock ring 310 to allow the mounts 202, 204 of the second example lock ring spreader 200 to be mounted near the ends 312, 314 of the lock ring 310. The lock ring 310 includes openings 316, 318 near the ends 312, 314 to allow the lock ring spreader 200 to be secured to the lock ring 310, as generally discussed above. Further separating the ends 312, 314 of the lock ring 310 (i.e., opening or expanding the lock ring 310) allows the lock ring 310 to be removed from the rim 305. Specifically, the lock ring 310 is spread apart to allow a contoured, radially inner face 320 to be spaced apart and removed from a gutter 322 formed in the rim 305. An o-ring (not shown) is typically seated in an annular groove 324 also formed in the rim 305.

While the lock ring 310 and the lock ring spreader 200 can be adapted (e.g., contoured, sized, etc.) to meet various application-specific requirements, the location of the openings 316, 318 in the lock ring 310 and the throw (i.e., how much the mounts 202, 204 spread apart during operation of the lock ring spreader 200) are critical to the successful and repeated installation and removal of the lock ring 310 to and from the rim 305. Specifically, the lock ring 310 and the lock ring spreader 200 are preferably configured such that the lock ring spreader 200 provides sufficient throw to easily remove the lock ring 310 from the rim 305 (i.e., unseat the lock ring 310 from the gutter 322) without plastically deforming any portion of the lock ring 310. Plastic deformation of the lock ring 310 is undesirable as it can reduce the effective spring force retaining the lock ring 310 and other components (i.e., the tire 303, the bead seat band 306, and the flange 308) on the rim 305.

Figure 21:
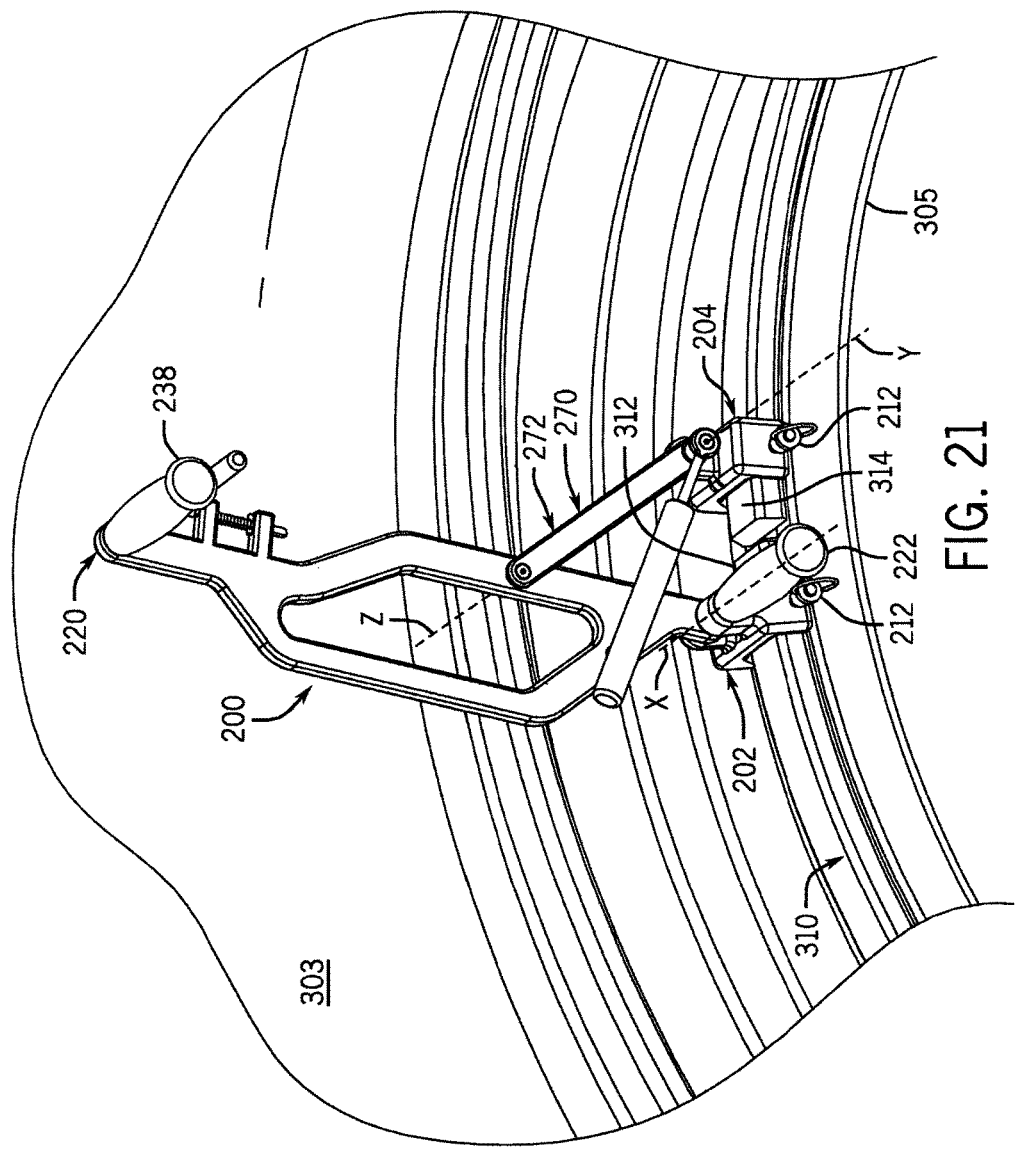
FIG. 21 is a partial isometric view of the second example lock ring spreader mounted to a lock ring of the example wheel assembly and in an unlocked position.
Figure 22:
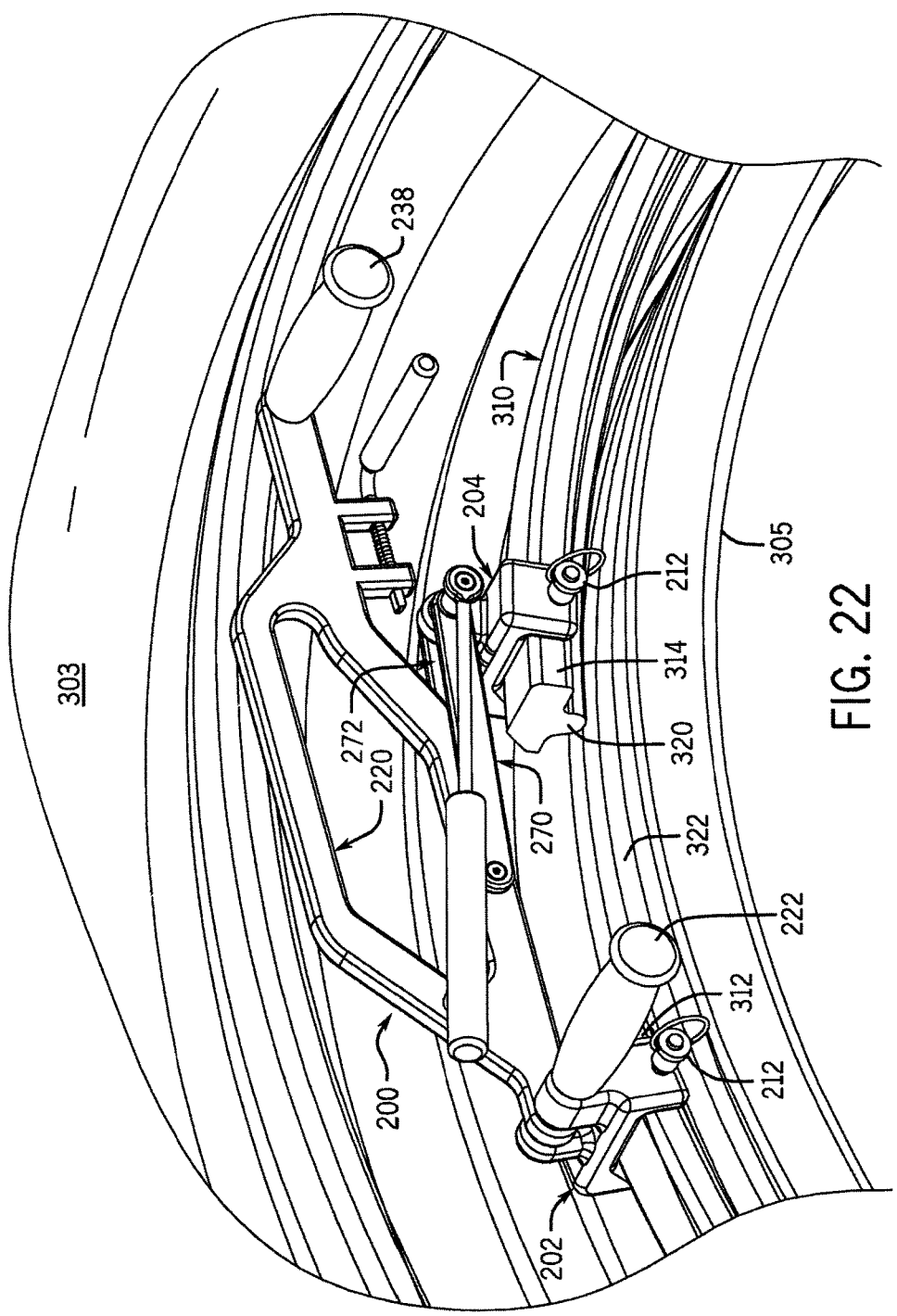
FIG. 22 is a partial isometric view similar to FIG. 21 with the second example lock ring spreader in an over-center position.
Figure 23:
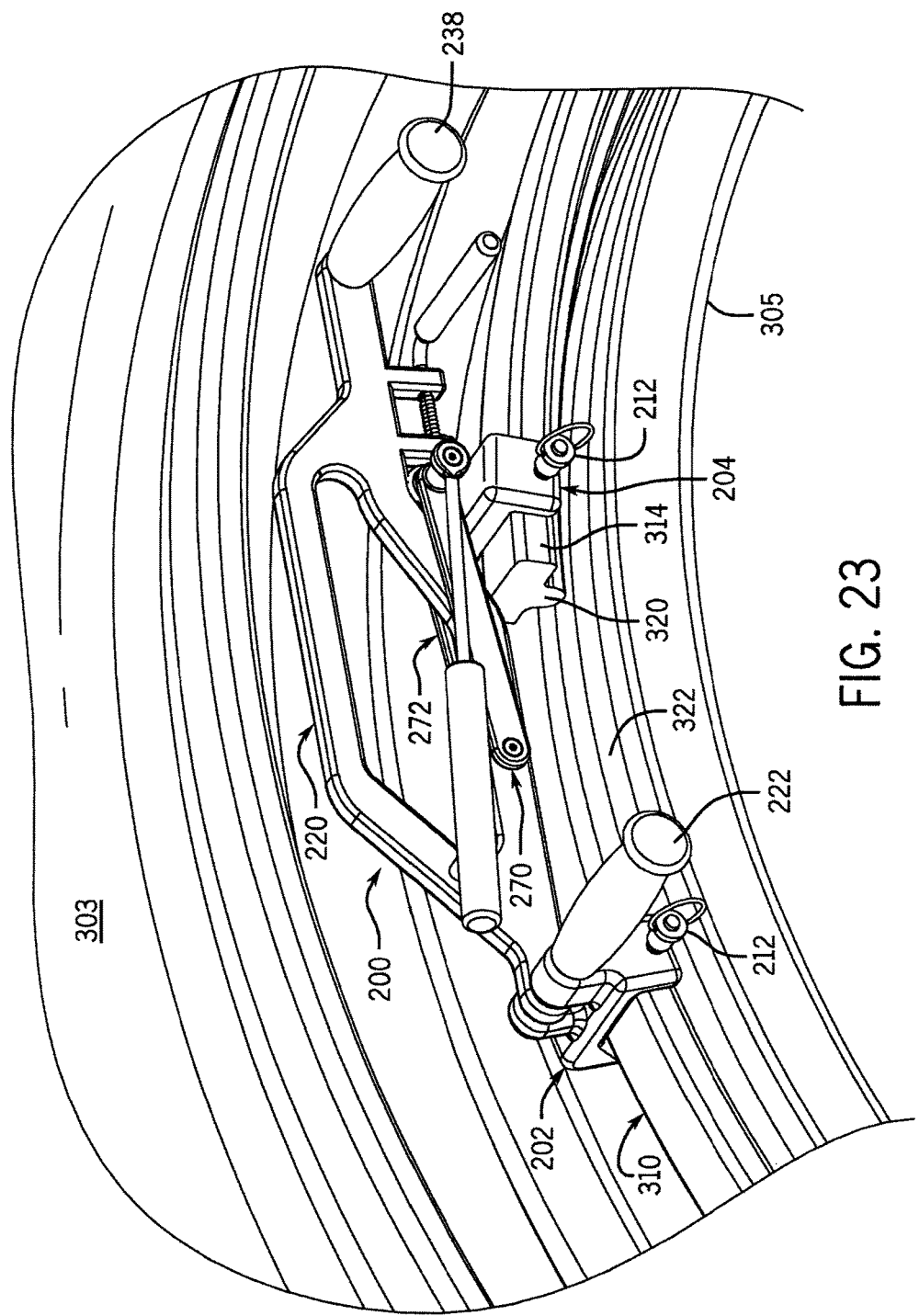
FIG. 23 is a partial isometric view similar to FIG. 22 with the second example lock ring spreader in a locked position.

With additional reference to FIGS. 21-23, the second example lock ring spreader 200 is shown mounted to and manipulating the ends 312, 314 of the lock ring 310. The lock ring spreader 200 is shown in FIG. 21 in an unlocked position and the lock ring 310 is shown fully installed and seated on the rim 305. To remove the lock ring 310 from the rim 305, the crank arm 220 is pivoted relative to the mount 202 toward the mount 204, which causes the link arms 270, 272 to pivot relative to both the mount 204 and the crank arm 220. This movement results in the mounts 202, 204, which are coupled to the lock ring 310 via pins 212, separating or moving apart. The ends 312, 314 of the lock ring 310 are furthest apart when the lock ring spreader 200 is in the over-center position illustrated in FIG. 22. It is this over-center position that controls the preferred engagement between the lock ring 310 and the lock ring spreader 200 to achieve the desired separation and throw, without over expanding the lock ring 310 causing plastic deformation. In this position, the lock ring 310 can be removed from the rim 305 as the contoured, radially inner face 320 is spaced apart from the gutter 322. However, as shown in FIG. 23, the lock ring spreader 200 is preferably moved into the locked position, which also allows the ends 312, 314 of the lock ring 310 to move slightly toward each other while maintaining a large enough inside diameter of the lock ring 310 such that the lock ring 310 can be easily uninstalled from or installed to the rim 305.

Figure 24:
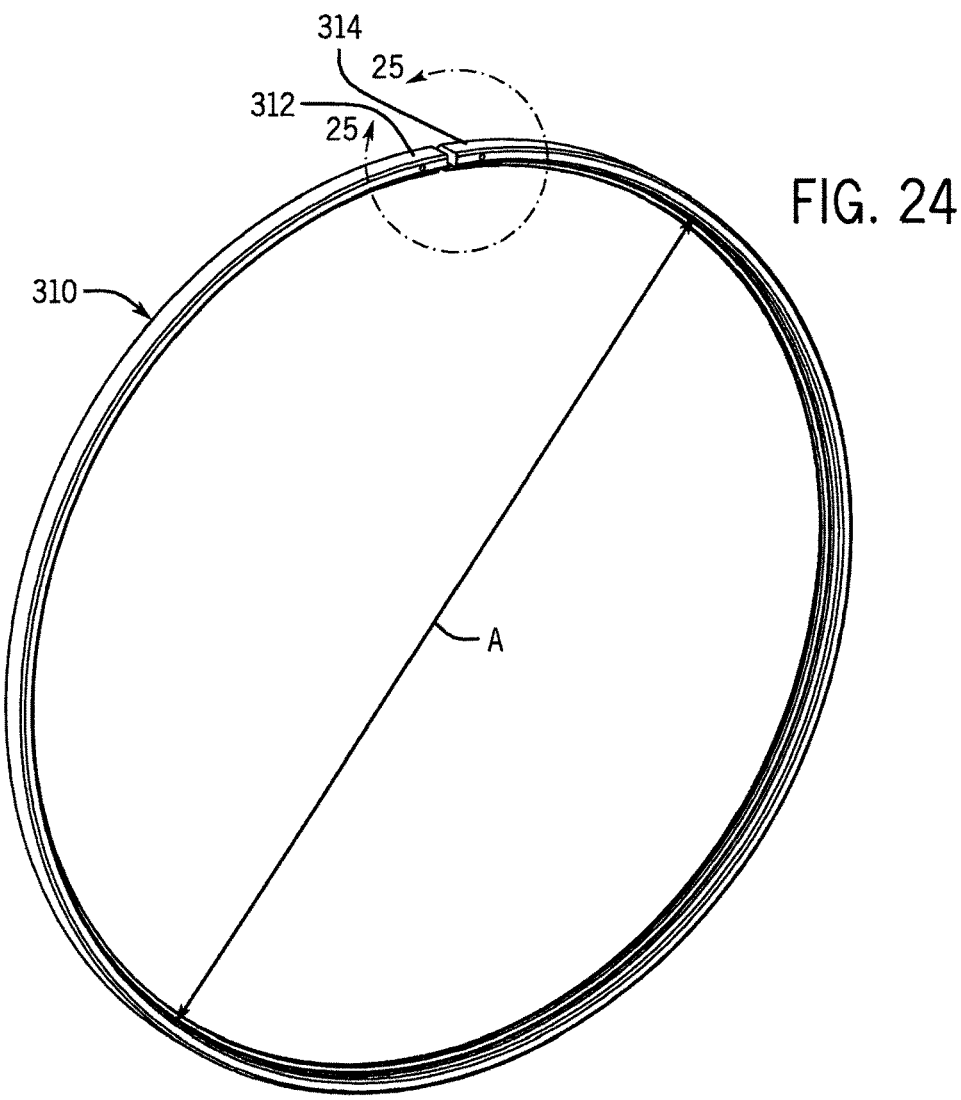
FIG. 24 is an isometric view of the example lock ring removed from the remainder of the wheel assembly.
Figure 25:
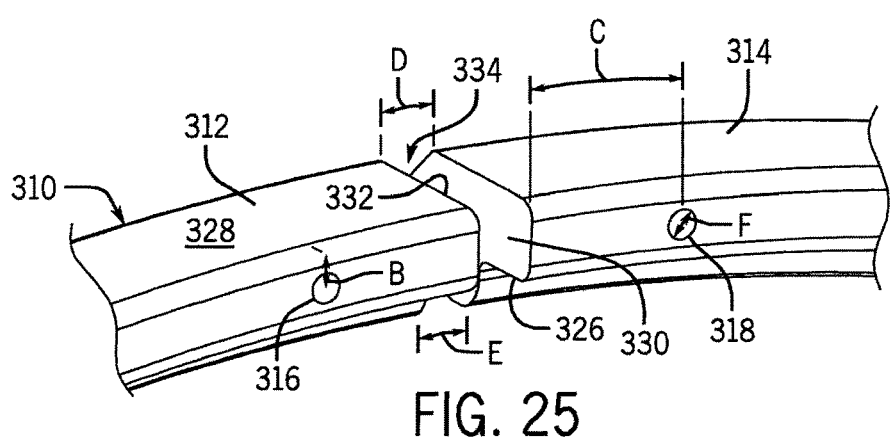
FIG. 25 is a partial detail view of the lock ring circumscribed by arc 25-25 shown in FIG. 24.

The specifics of the second example lock ring 310 are discussed with reference to FIGS. 24 and 25. The lock ring 310 is designed for use with a 57 inch rim. The interior diameter A (between inner surface 326 shown in FIG. 24) is approximately 54.9 inches as measured in a "natural" or an "unloaded" state (i.e., no external forces are applied to influence the relative position of the ends 312, 314). Each of the openings 316, 318 in the lock ring 310 is offset radially inward from an outer surface 328 a perpendicular distance B of approximately 0.42 inches and is spaced from a respective end face 330, 332 an arcuate distance C of approximately 1.75 inches. A wedge-shaped gap 334 is established between the end faces 330, 332 such that the end faces 330, 332 are spaced an arcuate distance D of approximately 0.64 inches at the radially outer edge and an arcuate distance E of approximately 0.58 at the radially inner edge. Each of the openings 316, 318 has a diameter of approximately 0.31 inches.

The second example lock ring spreader 200 is configured to provide the requisite amount of throw given the above, application-specific dimensions and considerations of the lock ring 310. Specifically, with reference to FIG. 21, the perpendicular distance between pivot axis X and pivot axis Z, the perpendicular distance between pivot axis Y and pivot axis Z, and (when the lock ring spreader 200 is mounted to the lock ring 310) the perpendicular distance between pivot axis X and opening 316 (shown in FIG. 19) and the perpendicular distance between pivot axis Y and opening 318 (shown in FIG. 19) are configured to provide the requisite throw (in combination with the lock ring dimensions) to achieve proper operation without over-bending or over-expanding the lock ring.

The relative dimensions, cross section, mounting location, or other construction details of the lock ring spreader concept can be adapted depending on the particular application requirements. For instance, longer link arms can be incorporated to increase the distance the mounts are separated when the lock ring spreader is locked. Alternatively, the pivotal mounting locations can be adjusted to alter the geometry of the movement.

While there has been shown and described what is at present considered the preferred embodiments, it will be appreciated by those skilled in the art when given the benefit of this disclosure, that various changes and modifications can be made without departing from the scope of the invention defined by the following claims.

We claim:

1. A lock ring spreader capable of being mounted to a lock ring having a first end and a second end, the lock ring spreader comprising:
    a first mount mountable to the lock ring near the first end of the lock ring;
    a second mount mountable to the lock ring near the second end of the lock ring;
    a crank arm pivotally coupled to the first mount and extending radially outward from the first mount relative to the lock ring, wherein the crank arm includes a first latch member having a latch lever pivotally coupled to the crank arm, the latch lever including a grip portion and an engagement portion; and
    a link arm pivotally coupled to the second mount and the crank arm and extending radially outward from the second mount relative to the lock ring, wherein at least one of the second mount and the link arm includes a second latch member having a land, the first latch member and the second latch member are selectively coupled to inhibit relative movement between the crank arm and the second mount;
    wherein pivoting the crank arm radially inward relative to the lock ring pivots the link arm relative to the crank arm and expands a distance between the first mount and the second mount to an over-center position and then to a locked position once the lock ring spreader has moved past the over-center position, in the locked position the engagement portion contacts the land to inhibit relative movement between the first latch member and the second latch member, and
    wherein pivoting from the over-center position to the locked position reduces the distance between the first mount and the second mount.

2. The lock ring spreader of claim 1 wherein the first mount and the second mount each further comprise a pair of legs and a bridge extending between the pair of legs over a radially outer side of the lock ring.

3. The lock ring spreader of claim 2 wherein each leg of the pairs of legs includes an aligned hole that is sized to receive a respective mounting pin so that the first mount and the second mount can each be coupled to the lock ring with the respective mounting pin extending through the aligned hole and hole in sides of the lock ring.

4. The lock ring spreader of claim 1 wherein at least one of the first mount and the second mount is contoured to conform to the lock ring.

5. The lock ring spreader of claim 1 further comprising:
    a pair of projections extending from the first mount, wherein the crank arm is pivotally mounted between the pair of projections; and a projection extending from the second mount, wherein the link arm includes a pair of link arms pivotally mounted to the projection near first ends and pivotally mounted to the crank arm near second ends.

6. The lock ring spreader of claim 1 further comprising:
a first handle extending from the first mount; and
a second handle extending from the crank arm.

7. The lock ring spreader of claim 6 wherein the first handle extends substantially parallel to a first pivot axis about which the crank arm pivots.

8. The lock ring spreader of claim 1 wherein:
the crank arm includes a first end pivotally coupled to the first mount and a second end opposite to the first end; and
the link arm includes a first end pivotally coupled to the second mount and a second end opposite to the first end pivotally coupled to the crank arm between the first end and the second end of the crank arm.

9. The lock ring spreader of claim 1 further comprising a dampener including a first end coupled to at least one of the first mount and the second mount, and a second end coupled to at least one of the crank arm and the link arm.

10. The lock ring spreader of claim 1 wherein the first mount and the second mount each further comprise:
a bridge;
a first leg and a second leg extending perpendicularly from the bridge; and
a radially inward recess defined by the bridge, the first leg, and the second leg;
wherein the radially inward recess includes an angled portion defined by the first leg, a radial face defined by the bridge, and an axial face defined by the second leg that are contoured to engage the lock ring.

11. A lock ring spreader capable of being mounted to a lock ring defining a first end, a second end opposite to the first end, a first axial face, a second axial face opposite to the first axial face, and an outer radial face between the first axial face and the second axial face, the lock ring spreader comprising:
a first mount mountable to the lock ring near the first end of the lock ring, the first mount configured to substantially conform to at least one of the first axial face, the second axial face, and the outer radial face;
a second mount mountable to the lock ring near the second end of the lock ring, the second mount configured to substantially conform to at least one of the first axial face, the second axial face, and the outer radial face;
a crank arm having a first end that is pivotally coupled to the first mount near the first end, wherein the crank arm includes a first latch member having a latch lever pivotally coupled to the crank arm, the latch lever including a grip portion and an engagement portion; and
a link arm having a first end and a second end, the link arm is pivotally coupled to the second mount near the first end and to the crank arm near the second end, wherein at least one of the second mount and the link arm includes a second latch member having a land, the first latch member and the second latch member are selectively coupled to inhibit relative movement between the crank arm and the second mount;
wherein pivoting the crank arm radially inward toward the second mount relative to the lock ring pivots the link arm relative to the crank arm and initially expands a distance between the first mount and the second mount to an over-center position and then reduces the distance between the first mount and the second mount to a locked position once the lock ring spreader has moved past the over-center position, in the locked position the engagement portion contacts the land to inhibit relative movement between the first latch member and the second latch member.

12. The lock ring spreader of claim 11 further comprising a dampener including a first end coupled to one of the first mount and the second mount, and a second end coupled to one of the crank arm and the link arm.

13. The lock ring spreader of claim 11 further comprising a handle extending from the first mount.

14. A lock ring spreader capable of being mounted to a lock ring having a first end and a second end, the lock ring spreader comprising:
a first mount mountable to the lock ring near the first end of the lock ring;
a second mount mountable to the lock ring near the second end of the lock ring;
a crank arm pivotally coupled to the first mount about a first axis, wherein the crank arm includes a first latch member having a latch arm slidably coupled to the crank arm, the latch arm including a grip portion and an engagement portion; and
a link arm pivotally coupled to the second mount about a second axis and the crank arm about a third axis, the second axis being closer to a central axis of the lock ring than the third axis when the lock ring spreader is mounted to the lock ring, wherein at least one of the second mount and the link arm includes a second latch member having a recess, the first latch member and the second latch member are selectively coupled to inhibit relative movement between the crank arm and the second mount;
wherein pivoting the crank arm about the first axis between a first position and a second position pivots the link arm about the second axis and the third axis and expands a distance between the first mount and the second mount to an over-center position and then to a locked position once the lock ring spreader has moved past the over-center position, in the locked position the engagement portion extends into the recess to inhibit relative movement between the first latch member and the second latch member; and
wherein pivoting from the over-center position to the locked position reduces the distance between the first mount and the second mount.

15. The lock ring spreader of claim 14 wherein when the crank arm is in the first position a first distance between the first mount and the second mount is less than a second distance between the first mount and the second mount when the crank arm is in the second position.

16. The lock ring spreader of claim 14 wherein the first axis, the second axis, and the third axis are substantially parallel.

17. A lock ring spreader capable of being mounted to a lock ring having a first end and a second end, the lock ring spreader comprising:
a first mount mountable to the lock ring near the first end of the lock ring;
a second mount mountable to the lock ring near the second end of the lock ring;
a crank arm pivotally coupled to the first mount and extending radially outward from the first mount relative to the lock ring, wherein the crank arm includes a first latch member having a latch arm slidably coupled to the crank arm, the latch arm including a grip portion and an engagement portion; and a link arm pivotally coupled to the second mount and the crank arm and extending radially outward from the second mount relative to the lock ring, wherein at least one of the second mount and the link arm includes a second latch member having a recess, the first latch member and the second latch member are selectively coupled to inhibit relative movement between the crank arm and the second mount;

wherein pivoting the crank arm radially inward relative to the lock ring pivots the link arm relative to the crank arm and expands a distance between the first mount and the second mount to an over-center position and then to a locked position once the lock ring spreader has moved past the over-center position, in the locked position the engagement portion extends into the recess to inhibit relative movement between the first latch member and the second latch member, and wherein pivoting from the over-center position to the locked position reduces the distance between the first mount and the second mount.

* * * * *